United States Patent
Ranjbar et al.

(10) Patent No.: US 12,365,093 B1
(45) Date of Patent: Jul. 22, 2025

(54) SYNTHETIC ROBOT DATA GENERATION AND MODEL TRAINING WITH THE SYNTHETIC ROBOT DATA

(71) Applicant: Sanctuary Cognitive Systems Corporation, Vancouver (CA)

(72) Inventors: Mani Ranjbar, Port Coquitlam (CA); Hossein S. Darani, Burnaby (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 0 days.

(21) Appl. No.: 19/063,711

(22) Filed: Feb. 26, 2025

Related U.S. Application Data

(60) Provisional application No. 63/740,622, filed on Dec. 31, 2024.

(51) Int. Cl.
| | |
|---|---|
| *B25J 9/16* | (2006.01) |
| *G06T 3/4038* | (2024.01) |
| *G06T 7/70* | (2017.01) |
| *G06T 15/20* | (2011.01) |

(52) U.S. Cl.
CPC ............. *B25J 9/1697* (2013.01); *B25J 9/161* (2013.01); *B25J 9/163* (2013.01); *G06T 3/4038* (2013.01); *G06T 7/70* (2017.01); *G06T 15/205* (2013.01); *G06T 2200/04* (2013.01); *G06T 2200/08* (2013.01); *G06T 2207/20081* (2013.01); *G06T 2207/30196* (2013.01)

(58) Field of Classification Search
CPC .......... B25J 9/1697; B25J 9/161; B25J 9/163; G06T 3/4038; G06T 7/70; G06T 15/205; G06T 2200/04; G06T 2200/08; G06T 2207/20081; G06T 2207/30196
See application file for complete search history.

(56) References Cited

U.S. PATENT DOCUMENTS

| 12,269,170 B1 * | 4/2025 | Ranjbar | .................... B25J 9/163 |
| 2025/0068885 A1 * | 2/2025 | Poupyrev | ............ G06F 16/3329 |

FOREIGN PATENT DOCUMENTS

| CN | 111203878 A | * | 5/2020 | .............. B25J 9/163 |

OTHER PUBLICATIONS

S. Kareer, D. Patel, R. Punamiya, P. Mathur, S. Cheng, C. Wang, J. Hoffman, and D. Xu (2024). EgoMimic: Scaling Imitation Learning via Egocentric Video. arXiv:2410.24221.

Pavlakos, G., Shan, D., Radosavovic, I., Kanazawa, A., Fouhey, D., & Malik, J. (2024). Reconstructing hands in 3d with transformers. arXiv:2312.05251.

\* cited by examiner

*Primary Examiner* — Harry Y Oh
(74) *Attorney, Agent, or Firm* — Adenike Adebiyi; Thomas Mahon

(57) ABSTRACT

A method includes accessing first image data captured by a camera of an environmental scene in which a subject arm performs a task. A first image is obtained from the first image data. The first image includes a subject arm object representing the subject arm and a background representing the environmental scene. A set of robot arm parameters for the first image is determined at least in part based on the subject arm object. An image of a robot arm object is rendered based on the set of robot arm parameters and a robot arm model. The image of the robot arm object is composited with the first image to obtain a synthetic robot image, which may be used for generating training data for AI model training.

20 Claims, 15 Drawing Sheets

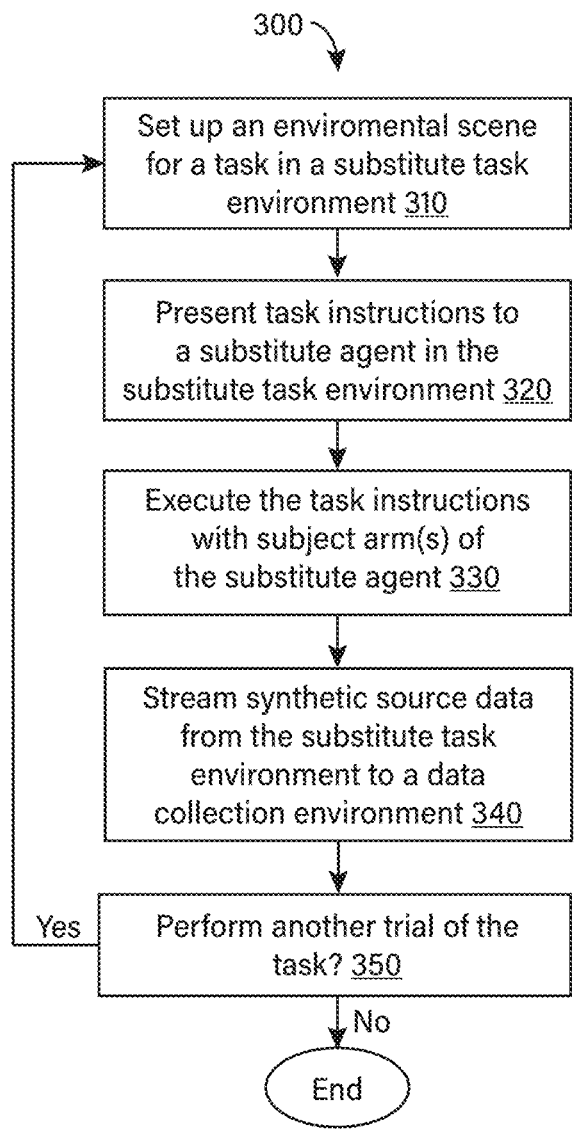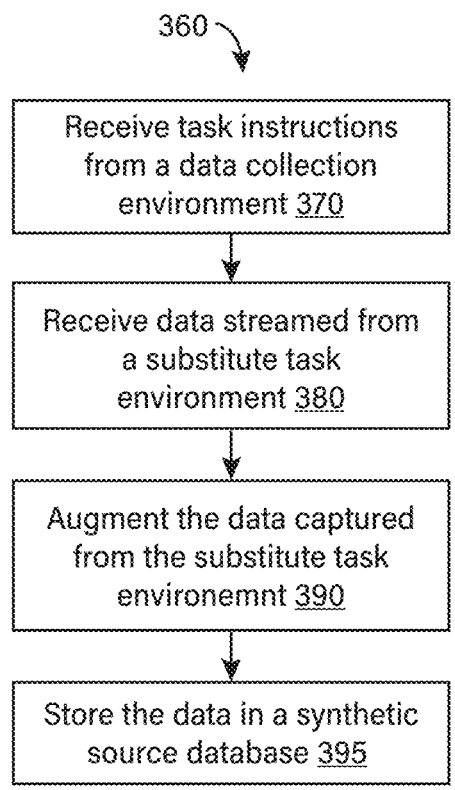
FIG. 3A
FIG. 3B

SYNTHETIC ROBOT DATA GENERATION AND MODEL TRAINING WITH THE SYNTHETIC ROBOT DATA

CROSS-REFERENCE TO RELATED APPLICATIONS

This application claims the benefit of U.S. Provisional Application No. 63/740,622 filed Dec. 31, 2024, the content of which is incorporated herein by reference in its entirety.

FIELD

The field relates generally to training of artificial intelligence models and in particular to generating training data for training of AI models for robot control systems.

BACKGROUND

Robots are machines that may be deployed to perform work. General purpose robots can be deployed in a variety of different environments to achieve a variety of objectives or perform a variety of tasks. To achieve a level of autonomy, robots can be controlled or guided by a control paradigm based on artificial intelligence (AI) models. Such AI models are trained using training data and can demand a significant quantity and/or variety of such training data.

In view of the success of Large Language Models (LLMs) such as the various incarnations of Generative Pre-Trained Transformer (GPT) by OpenAI, there has been considerable interest in developing Large Behavior Models (LBMs), which may also be referred to as Embodied Foundation Models (EFMs) or Large-Action Models (LAMs). An LBM is a form of AI system that can accept context data for a dynamic mechanical system and output behavior (e.g., actions or instructions) for the dynamic mechanical system to perform. LBMs that can enable a general purpose robot to perform human-like tasks in a real world are of considerable interest.

One strategy for training an LBM is behavior cloning, which is a form of imitation learning where the model learns a policy to match expert demonstrations. To train an LBM with behavior cloning, a relatively large corpus of expert demonstrations from which the model may learn is needed. However, collecting such expert demonstrations for a robot at a level sufficient for an LBM to learn a policy for the robot has been challenging.

SUMMARY

Disclosed herein are technologies that can generate synthetic robot data. At least a subset of a training dataset can be generated with the synthetic robot data and used to train or pre-train an AI model for robot control.

In a representative example, a method implemented by a computing system includes accessing first image data captured by a first camera of a first environmental scene in which a subject arm of a substitute agent performs a first task. The method includes obtaining a sequence of first images from the first image data. Each first image includes a subject arm object representing the subject arm and a background representing the first environmental scene. A set of robot arm parameters is determined for each respective first image in the sequence of first images. At least one of the robot arm parameters in the set of robot arm parameters is determined based on the subject arm object in the respective first image. For each set of robot arm parameters, an image of a robot arm object is rendered based on the set of parameters and a robot arm model. For each robot arm object, the image of the robot arm object is composited with the respective first image in the sequence of first images to obtain a synthetic robot image including the robot arm object and the background of the respective first image. A sequence of synthetic robot images corresponding to the sequence of first images is formed with the synthetic robot images. The sequence of synthetic robot images may be stored in memory and may be used in generating training data for AI model training.

BRIEF DESCRIPTION OF THE DRAWINGS

FIGS. 3A and 3B are flow diagrams of a method of generating synthetic source data.

DETAILED DESCRIPTION

General Considerations

Figures 1A, 1B:
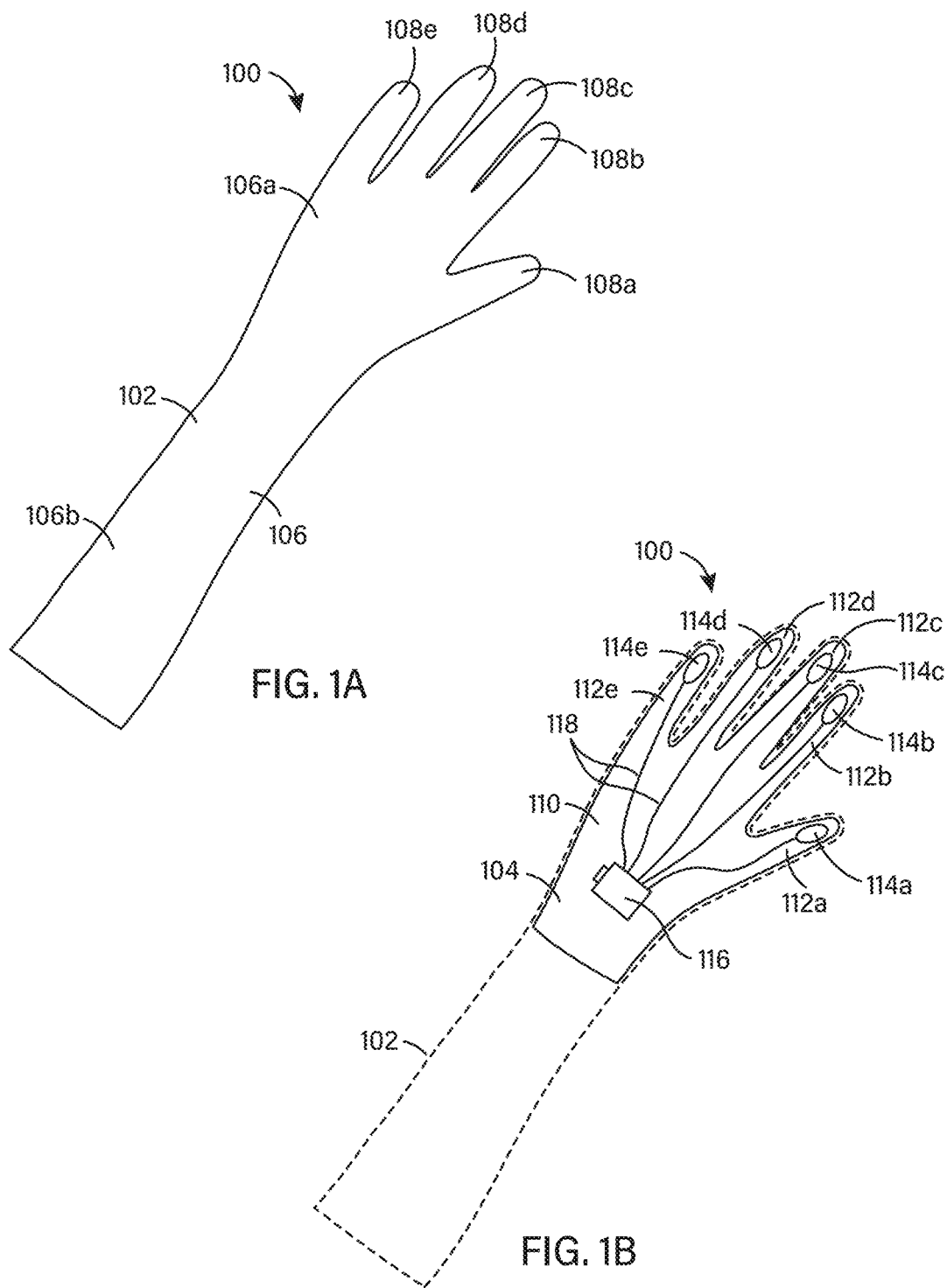
FIG. 1A is a schematic of a data glove that may be worn on a subject arm to perform a task.
FIG. 1B is a schematic illustrating the data glove of FIG. 1A with an inner sensor glove.

For the purpose of this description, certain specific details are set forth herein in order to provide a thorough understanding of disclosed technology. In some cases, as will be recognized by one skilled in the art, the disclosed technology may be practiced without one or more of these specific details, or may be practiced with other methods, structures, and materials not specifically disclosed herein. In some instances, well-known structures and/or processes associated with robots have been omitted to avoid obscuring novel and non-obvious aspects of the disclosed technology.

All the examples of the disclosed technology described herein and shown in the drawings may be combined without any restrictions to form any number of combinations, unless the context clearly dictates otherwise, such as if the proposed combination involves elements that are incompatible or mutually exclusive. The sequential order of the acts in any process described herein may be rearranged, unless the context clearly dictates otherwise, such as if one act or operation requests the result of another act or operation as input.

In the interest of conciseness, and for the sake of continuity in the description, same or similar reference characters may be used for same or similar elements in different figures, and description of an element in one figure will be deemed to carry over when the element appears in other figures with the same or similar reference character, unless stated otherwise. In some cases, the term "corresponding to" may be used to describe correspondence between elements of different figures. In an example usage, when an element in a first figure is described as corresponding to another element in a second figure, the element in the first figure is deemed to have the characteristics of the other element in the second figure, and vice versa, unless stated otherwise.

The word "comprise" and derivatives thereof, such as "comprises" and "comprising", are to be construed in an open, inclusive sense, that is, as "including, but not limited to". The singular forms "a", "an", "at least one", and "the" include plural referents, unless the context dictates otherwise. The term "and/or", when used between the last two elements of a list of elements, means any one or more of the listed elements. The term "or" is generally employed in its broadest sense, that is, as meaning "and/or", unless the context clearly dictates otherwise. When used to describe a range of dimensions, the phrase "between X and Y" represents a range that includes X and Y. As used herein, an "apparatus" may refer to any individual device, collection of devices, part of a device, or collections of parts of devices.

The term "coupled" without a qualifier generally means physically coupled or lined and does not exclude the presence of intermediate elements between the coupled elements absent specific contrary language. The term "plurality" or "plural" when used together with an element means two or more of the element. Directions and other relative references (e.g., inner and outer, upper and lower, above and below, and left and right) may be used to facilitate discussion of the drawings and principles but are not intended to be limiting.

The headings and Abstract are provided for convenience only and are not intended, and should not be construed, to interpret the scope or meaning of the disclosed technology.

Example I—Overview

Data collection is a major bottleneck in training large behavior models (LBMs) for robots by behavior cloning since such training requires a large corpus of expert data. To appreciate the challenges, one example training data collection process that is currently employed includes controlling a robot to perform a task by emulating movements of a human teleoperator in real time and collecting sensor data from the robot. The sensor data can be used as source data for generating training data. Each trial of the task can correspond to one training sample, which means that if, for example, one thousand training samples are needed, each of the human teleoperator and robot will have to perform the task at least one thousand times. Each trial of the task involves setup time for both the human teleoperator and the robot since the movements of the human teleoperator have to be translated into controls for the robot. Any hardware issues will add to the setup time for the trial. There can be latency in teleoperation of the robot by the human teleoperator that adds to the time it takes to complete a trial. The robot may not be able to move as fast as the human teleoperator so that the speed of completing each trial is limited by the ability of the robot to physically emulate the movements of the human teleoperator.

Example technologies disclosed herein enable scaling up of data collection for training of an AI model by taking advantage of the faster speed at which humans can complete human-like tasks compared to untrained robots. In some examples, sensor data are captured from an environment in which a human agent is performing a task. The sensor data can include human images of a scene of the task. The human images can be egocentric images captured from an egocentric viewpoint or perspective of the human agent. The human images are processed to replace human arms in the human images with robot arms so that it appears that the task was performed by a robot. Since a human can generally perform human-like tasks much faster than an untrained robot can perform the same tasks, the speed at which synthetic robot data can be produced from human-sourced data can far exceed the speed at which true robot data can be collected directly with the robot, resulting in a significant reduction in the amount of time needed to collect sufficient data for AI model training.

Example II—Subject Arm Configuration

In examples herein, a substitute agent (e.g., a human agent) can have at least one subject arm (e.g., a human agent can have two subject arms). In the convention used herein, the term "subject arm" will refer to an entire arm of the substitute agent. The subject arm can include a hand (corresponding to a distal part of the subject arm) and a proximal arm (corresponding to a proximal part of the subject arm). The proximal arm is coupled to the hand by a wrist, which is considered as part of the hand or distal part of the subject arm in the convention used herein. The hand of a subject arm may be referred to as a "subject hand" in the convention used herein.

In examples herein, a subject arm can be configured as a chroma key arm by covering at least a distal part of the subject arm with a chroma key material. In some examples, the distal part and at least a portion of the proximal arm of the subject arm may be covered with the chroma key material. In some examples, a subject arm configured as a chroma key arm may be used to perform a task (e.g., a sequence of actions) in an environmental scene.

A chroma key material is a material having a color characteristic that is dependent and distinct from an environment of use. For example, given an environmental scene in which a task is to be performed, the chroma key material can be a material having a color characteristic that is distinct from the color characteristics of object surfaces in the environmental scene so that the chroma key material is highlighted relative to the environmental scene. In some examples, the color characteristic of the chroma key material, which may also be referred to as chroma key color, can be a single solid color (e.g., solid green color or solid blue color). In some examples, the chroma key material can be opaque so that the color characteristic of any part of the subject arm covered by the chroma key material is not visible through the material.

In examples herein, synthetic source data can include various types of data collected from an environment in which a substitute agent (e.g., a human agent) performs a task. In some examples, synthetic source data can include synthetic source image data captured by a camera of an environmental scene in which at least one subject arm of the substitute agent performs a task. The synthetic source image data may be captured from an egocentric viewpoint of the substitute agent. In some examples, the synthetic source image data can contain chroma key data if the subject arm of the substitute agent is configured as a chroma key arm. For example, a synthetic source image obtained from the synthetic source image data can include a subject arm object having the distinct color characteristic of the chroma key material used in configuring the chroma key arm and a background corresponding to the environmental scene.

In examples herein, synthetic robot data can include synthetic robot images generated by replacing subject arm objects in synthetic source images (obtained from synthetic source image data) with respective robot arm objects. In examples where the subject arm is configured as a chroma key arm, the distinct color characteristic of the chroma key material can facilitate processing of the synthetic source images to obtain the synthetic robot images.

FIGS. 1A and 1B illustrate an example data glove 100 that may be used to configure a subject arm as a chroma key arm. The data glove 100 includes an outer chroma glove 102 made of a chroma key material as described herein. The outer chroma glove 102 includes a glove body 106 having a distal part 106a that is shaped to receive a distal part of a subject arm and a proximal part 106b that is shaped to receive at least a portion of a proximal part of the subject arm. In the illustrated example, the distal part 106a has finger parts 108a-e to receive individual fingers of a hand of the subject arm.

In some examples, the data glove 100 may include an inner sensor glove 104 (shown in FIG. 1B) that can be worn inside the outer chroma glove 102. In the illustrated example, the inner sensor glove 104 has a glove body 110 that is shaped to receive the distal part of the subject arm. The glove body 110 has finger parts 112a-e that can receive individual fingers of the hand of the subject arm. The inner sensor glove 104 has sensors 114a-e, which in the illustrated example are attached to the finger parts 112a-e of the glove body 110. Although not shown, sensors may be attached to other parts of the glove body 110 (such as a part of the glove body 110 that would cover a palm of the hand). The inner sensor glove 104 may include an electronics module 116 that is communicatively coupled to the sensors 114a-e (e.g., via wired connections 118). The electronic module 116 may be attached to the glove body 110 (e.g., to a part of the glove body 110 away from the finger parts 112a-e).

The gloves 102, 104 may be individual wearables that can be placed on the subject arm separately. For example, at least the distal part of the subject arm may be inserted into the inner sensor glove 104 to form a sensorized subject arm. Then, at least a distal part of the sensorized subject arm may be inserted into the outer chroma glove 102 to form the chroma key arm. In other examples, the inner sensor glove 104 may be attached to the inner side of the outer chroma glove 102 to form a unitary piece that can be worn on the subject arm in one step. Both the inner sensor glove 104 and the outer chroma glove 102 may be stretchable or have closures to facilitate wearing and form-fitting of the data glove 100 on the parts of the subject arm to be covered by the data glove 100.

In some examples, the sensors 114a-e may include sensors that track movements of fingers of the subject hand and output sensor data corresponding to the finger movements. In some examples, the sensors 114a-e may include other types of sensors (e.g., haptic sensors or tactile sensors) to detect other types of stimuli. In other examples, the sensor configuration of the sensor glove 104 may generally match a sensor configuration of a target robot hand so that the synthetic source data can contain the same scope of sensor data for the subject hand that true robot data would have for the target robot hand. For example, if a robot hand of interest has tactile sensors, the sensor glove 104 may include tactile sensors. In some examples, any suitable motion capture glove (e.g., gloves by Manus) may be used as the inner sensor glove 104. In some examples, the sensor data outputted by sensors of the sensor glove 104 may be collectively referred to as "hand sensor data". The hand sensor data can contain finger sensor data (i.e., data from sensors coupled to the fingers of the hand).

The electronics module 116 may be communicatively coupled to an external system, such as a data capture agent (226 in FIGS. 2A and 2B and Example III), through an appropriate communication or messaging service. The electronics module 116 may perform various functions related to functioning of the sensors 114a-e, such as receiving and processing data from the sensors 114a-e (e.g., applying timestamps to the sensor data), transmitting sensor data to an external system (e.g., a data capture agent), and distributing electrical power (e.g., from an onboard battery) to the sensors 114a-e.

In some examples, the hand sensor data collected with sensors of the sensor glove 104 can form part of the synthetic source data that can be used to produce synthetic robot data.

Example III—Synthetic Source Data Generation System

Figure 2A:
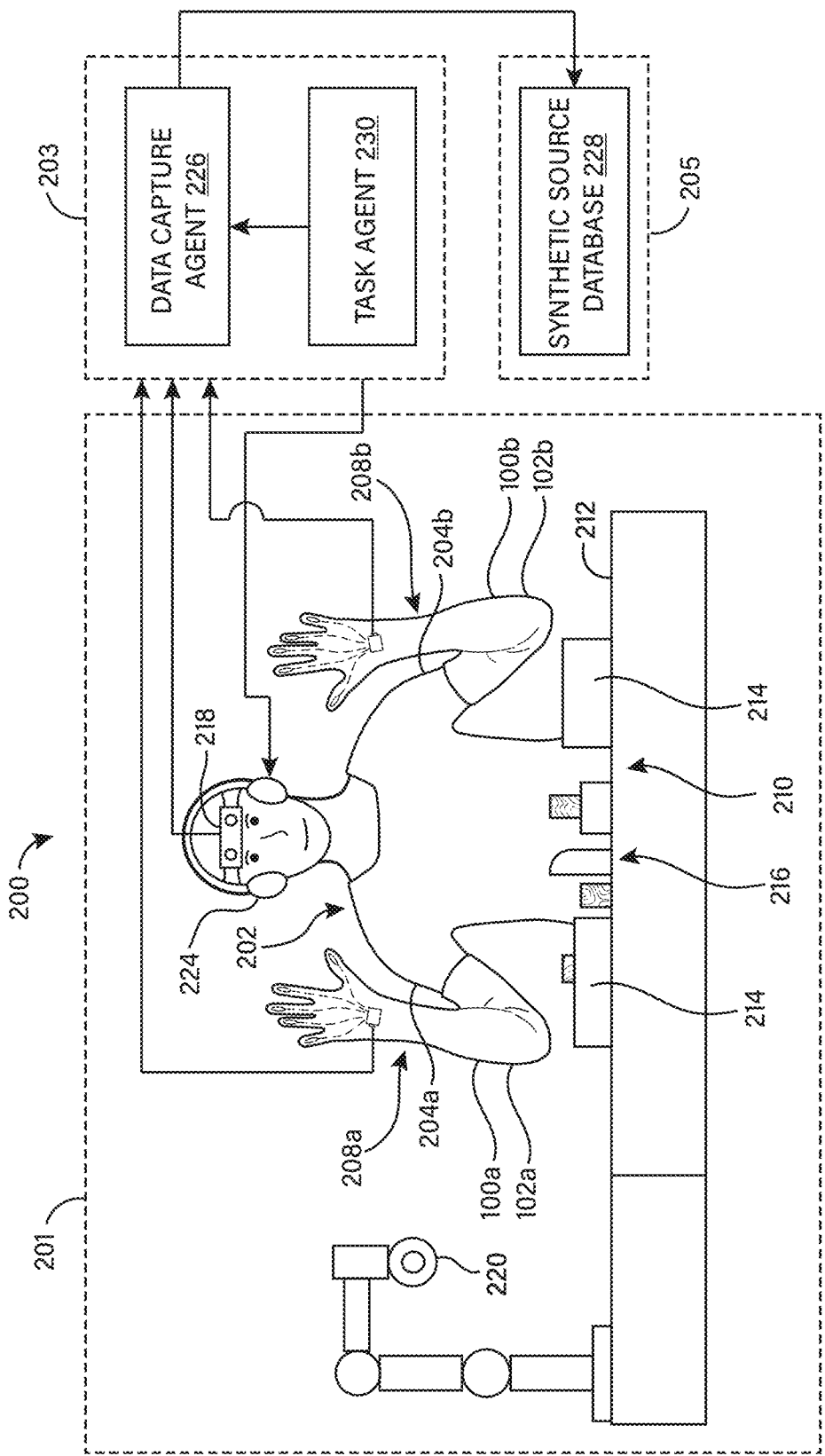
FIGS. 2A and 2B are schematics of a system that may be used to generate synthetic source data from a substitute task environment.

FIG. 2A shows an example system 200 that may be used to generate synthetic source data. The system 200 includes a substitute task environment 201 (e.g., a human task environment) in which a substitute agent 202 (e.g., a human agent) performs a task, a data collection environment 203 in which sensor data outputted from sensors in the substitute task environment 201 can be captured as part of synthetic source data, and a data store 205 in which the synthetic source data can be stored for further use (e.g., to produce synthetic robot data). The data store 205 may stored in one or more computer readable storage media (or memory), which may be local to the data collection environment 203 or in a cloud. Similarly, the data collection environment 203 may be local to the substitute task environment 201 or may be remote from the substitute task environment 201.

In some examples, any or both of the subject arms 204a, 204b of the substitute agent 202 may be configured as chroma key arms 208a, 208b, for example, by inserting the subject arms 204a, 204b, or at least distal parts thereof, into data gloves 100a, 100b (100 in FIGS. 1A-1B and Example II). The data gloves 100a, 100b include outer chroma gloves 102a, 102b (102 in FIGS. 1A-1B and Example II) made of chroma key material. The lengths of the outer chroma gloves 102a, 102b may be such that any parts of the subject arms

204*a*, 204*b* that may appear in a synthetic source image captured from a scene of a task are covered by the outer chroma gloves 102*a*, 102*b*. In some examples, only one of the subjects arms 204*a*, 204*b* may be configured as a chroma key arm (e.g., if only one subject arm is needed to perform a task).

In other examples, the subject arms 204*a*, 204*b* may not be configured as chroma key arms or may be configured only as sensorized arms (e.g., by inserting the subject arms 204*a*, 204*b* into sensor gloves (104 in FIG. 1B and Example II) or otherwise coupling sensors to the subject arms 204*a*, 204*b*).

The substitute task environment 201 may include an environmental scene 210 in which a given task is to be performed by at least one subject arm 204*a*, 204*b*, which may or may not be configured as chroma key arms 208*a*, 208*b*. The given task can be any type of task that the substitute agent 202 is capable of performing competently with the subject arms 204*a*, 204*b* (or hands thereof). For illustrative purposes, in FIG. 2A, the example environmental scene 210 includes a surface 212 (e.g., a surface of a table), bins 214 on the surface 212, and objects 216 (e.g., blocks) to be sorted into the bins 214. If the subject arms 204*a*, 204*b* are configured as chroma key arms 208*a*, 208*b*, the chroma key material used in forming the outer chroma gloves 102*a*, 102*b* would have a color characteristic that is distinct from the color characteristics of the object surfaces in the environmental scene 210 as described in Example II. In some examples, if both subject arms 204*a*, 204*b* are configured as chroma key arms 208*a*, 208*b*, the chroma key arm 208*a* may have a color characteristic (or chroma key color) that is different from that of the chroma key arm 208*b*, which may help with distinguishing the chroma key arms 208*a*, 208*b* when they appear together in a synthetic source image.

The substitute task environment 201 includes a camera 218 that captures the environmental scene 210 as the substitute agent performs a task in the environmental scene 210 with the subject arm(s) 204*a*, 204*b*, which may or may not be configured as chroma key arm(s) 208*a*, 208*b*. In some examples, the camera 218 is arranged to capture egocentric image data (i.e., image data captured from an egocentric viewpoint of the substitute agent 202). In the illustrated example, the camera 218 is attached to the head of the substitute agent 202 to have an egocentric viewpoint of the substitute agent 202. In other examples, the camera 218 may be coupled to a different part of the substitute agent 202, such as the chest of the substitute agent 202, to have an egocentric viewpoint of the substitute agent 202.

The camera 218 may be a standalone camera device or may be a camera feature of a wearable device (e.g., smart glasses, augmented reality headset, virtual reality headset, or mixed reality headset). In some examples, the camera 218 may be a 2D color camera (e.g., a camera capable of outputting RGB images or video). In other examples, the camera 218 may be a 3D color camera (e.g., a camera capable of outputting RGB images or video with depth information). In some examples, the image data captured by the camera 218 may be in the form of one or more videos. In some examples, the camera 218 may be capable of applying timestamps to the image data that it captures from the scene.

In some examples, the substitute task environment 201 may include a camera 220 that captures other views of interest in the substitute task environment 201. For example, the camera 220 may capture the scene of the task (e.g., the environmental scene 210) from a viewpoint that is different from the egocentric viewpoint of the substitute agent 202. The output of the camera 220 may be part of the synthetic source data or may be used for other purposes, such as remote monitoring of the substitute task environment 201 (e.g., remote monitoring of the substitute task environment 201 from the data collection environment 203).

Figure 2B:
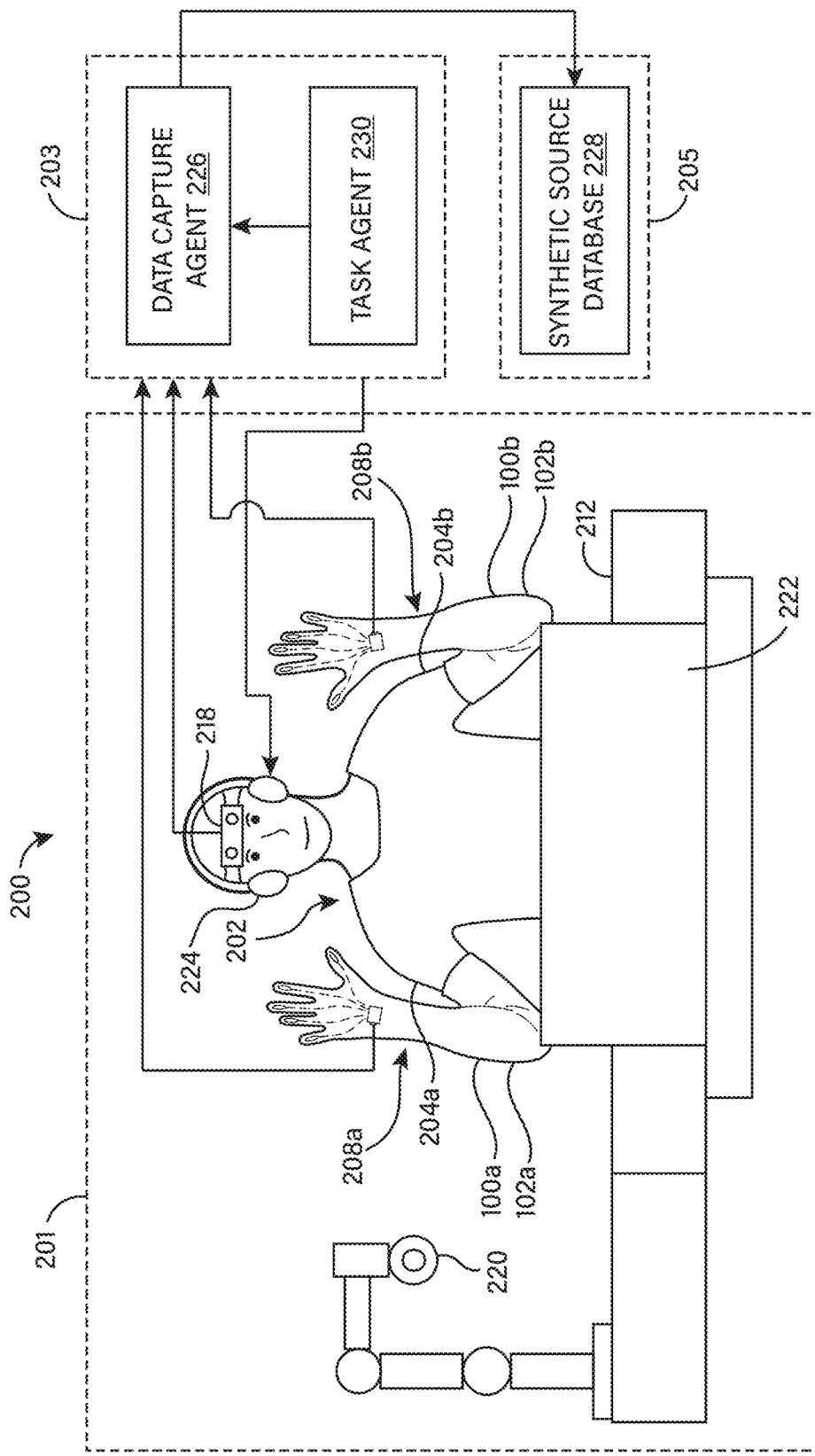

In some examples, the substitute task environment 201 may include any combination of interfaces to present information (e.g., task instructions) to the substitute agent 202. For example, FIG. 2B shows an electronic display 222 that may be used to present visual information to the substitute agent 202 and an audio headset 224 that may be used to present audio information to the substitute agent 202. In some examples, if the substitute agent 202 uses a reality headset (e.g., if the camera 218 is a camera feature of a reality headset), any combination of visual information and audio information may be presented to the substitute agent 202 via the reality headset.

The data collection environment 203 may include a data capture agent 226, which can be communicatively coupled to sensing devices in the substitute task environment 201 to receive parts of the synthetic source data streamed from the sensing devices. In some examples, the data capture agent 226 receives synthetic source image data from the camera 218. The data capture agent 226 may receive hand sensor data from sensors coupled to the subject arm(s) 204*a*, 204*b* (e.g., the sensors may be coupled to the subject arm(s) 204*a*, 204*b* by inserting the subject arm in a sensor glove (104 in FIG. 1B and Example II). The data capture agent 226 may receive sensor data from other sensing devices in the substitute task environment 201 (e.g., from the camera 220).

The data capture agent 226 may apply timestamps to the synthetic source data that it captures from the substitute task environment 201. These timestamps can be in addition to the timestamps applied to the synthetic source data in the substitute task environment 201. The data capture agent 226 may generate metadata for the synthetic source data and augment the synthetic source data with the metadata. The data capture agent 226 may store the synthetic source data (either the captured version or the augmented version) in a synthetic source database 228 (e.g., a time series database) in the data store 205 (or memory).

The data collection environment 203 may include a task agent 230 that issues task instructions to the substitute task environment 201. The task instructions may be presented to the substitute agent 202 via any of the presentation interfaces in the substitute task environment 201 (e.g., via the electronic display 222 or the audio headset 224). In some examples, the task agent 230 may be communicatively coupled to the data capture agent 226 and may transmit task instructions to the data capture agent 226, which the data capture agent 226 may associate with the synthetic source data captured during execution of the task instructions in the substitute task environment 201. The data capture agent 226 may augment the synthetic source data that is stored in the synthetic source database 228 with at least a portion of the task instructions.

The data capture agent 226 and the task agent 230 may be processes running on a computing system in the data collection environment 203 and may communicate with the substitute task environment 201 through any suitable messaging or communication service. The computing system may include a non-transitory computer readable storage medium (or memory) that may have program instructions stored thereon that are executable by a processor. The computing system may include one or more processors to execute program instructions stored in the memory.

Example IV.A—Synthetic Source Data Generation Method

FIG. 3A is a flow diagram illustrating a method 300 of generating substitute source data. The method 300 may be performed using the system 200 described in Example III and shown in FIGS. 2A and 2B. The method 300 is illustrated from a context of a substitute task environment (201 in FIGS. 2A and 2B and Example III). The operations in FIG. 3A may be reordered and/or repeated as desired and appropriate.

Referring to FIG. 3A, at 310, an environmental scene for a task is set up in a substitute task environment. The environmental scene is a portion of the substitute task environment including objects that a substitute agent (e.g., a human agent) may interact with to perform a task. The environmental scene may include a particular arrangement of the objects. The environmental scene may be set up by the substitute agent or by another agent or system (e.g., another human agent or artificial agent or automated system). The environmental scene may be set up in response to instructions to set up an environmental scene from a task agent in a data collection environment.

Operation 310 can include arranging a camera to capture image data of the environmental scene from an egocentric viewpoint of the substitute agent. For example, the camera may be worn on the head of the substitute agent (or other part of the substitute agent) to have an egocentric viewpoint of the substitute agent (see camera 218 in FIGS. 2A-2B). If the substitute agent is performing a task in the environmental scene with subject arm(s) while the image data are captured, the subject arm(s) can appear in the image data as subject arm object(s).

In some examples, the model of the camera used in operation 310 can be the same as the model of a camera on a target robot (e.g., a robot that would be used to collect true robot data for the same task). In some examples, the camera captures color images (e.g., RGB images) of the environmental scene. In some examples, the camera may capture 2D color images (e.g., RGB images). In other examples, the camera may capture 3D color images (e.g., RGB images with depth information). In some examples, the camera may capture images of the environmental scene as one or more videos.

Operation 310 may include configuring the subject arm(s) of the substitute agent as chroma key arm(s) as described in Example II. The chroma key material selected for configuring the chroma key arm can have a color characteristic that is distinct from the color characteristics of object surfaces in the environmental scene. In some examples, the color characteristic of the chroma key material may be a solid green color or a solid blue color.

In some examples, if both subject arms of the substitute agent are configured as chroma key arms, the chroma key arms may use chroma key materials having different color characteristics. For example, one chroma key arm (e.g., a right chroma key arm) may use a chroma key material having a solid green color, and the other chroma key arm (e.g., a left chroma key arm) may use a chroma key material having a solid blue color. Using chroma key materials with different color characteristics for the two chroma key arms may facilitate distinguishing between the two chroma key arms when they appear together in a synthetic source image.

Operation 310 may include coupling sensors to the subject arm(s) (or hand(s) thereof) of the substitute agent. In some examples, sensors may be coupled to a subject arm or hand by inserting at least a distal part of the subject arm in a sensor glove as described in Example II.

At 320, task instructions may be presented to the substitute agent in the substitute task environment. The task instructions may be communicated to the substitute task environment from the task agent in the data collection environment and presented to the substitute agent via any suitable presentation interface (e.g., electronic display or audio headset) in the substitute task environment. The task instructions can include a set of actions for the substitute agent to perform in the environmental scene. The task instructions can be the same task instructions that would be provided to a teleoperator (or teleoperation pilot) to cause a robot to perform the same given task in the same type of environmental scene.

At 330, the substitute agent executes the task instructions in the substitute task environment using the subject arm(s), which may or may not be configured as chroma key arm(s) and may or may not be configured as sensorized arm(s).

At 340, while the substitute agent executes the task instructions in operation 300, synthetic source data (e.g., image data and sensor data) are streamed from the substitute task environment to the data collection environment.

In some examples, synthetic source image data captured by the camera of the environmental scene can be streamed to the data collection environment. The synthetic source image data may be egocentric image data captured from an egocentric viewpoint of the substitute agent. The camera may apply timestamps to the synthetic source image data prior to streaming the data to the data collection environment.

In some examples, synthetic source sensor data outputted by sensors coupled to the substitute agent or in the substitute task environment can be streamed to the data collection environment. The synthetic source sensor data can include hand sensor data generated by sensors coupled to the subject hand(s) of the substitute agent. The hand sensor data may include sensor data representing finger movements. In some examples, the hand sensor data may include other types of data (e.g., tactile or haptic sensor data). The sensors, or electronic modules of the sensor glove(s), may apply timestamps to the sensor data prior to streaming the sensor data to the data collection environment.

At 350, the substitute agent may determine if another trial of the task should be performed. If the substitute agent determines that there is another trial of the task to be performed (e.g., based on communication from the task agent), the method can return to operation 310 for another trial of the task. During subsequent trials of the task, operations that are not needed may be omitted. For example, if the substitute agent is still wearing the camera, operation 310 may not include arranging a camera to capture image data of the environmental scene. If there are no other trials of the task to be performed, the substitute agent may end the synthetic source data generation session (e.g., by removing or deactivating the camera and data or sensor glove(s), if used).

Example IV.B—Synthetic Source Data Collection Method

FIG. 3B is a flow diagram illustrating a method 360 of collecting synthetic source data. The method 360 may be performed using the system 200 described in Example III. The method 360 is from a context of a data capture agent in a data collection environment (203 in FIGS. 2A and 2B and Example III). The operations in FIG. 3B may be reordered and/or repeated as desired and appropriate.

At 370, in a data collection environment, a data capture agent may receive task instructions from a task agent. The data capture agent may receive task instructions whenever a substitute agent receives task instructions in a substitute task environment (see operation 320 in FIG. 3A and Example IV.A). The task instructions received by the data capture agent can be the same task instructions presented to the substitute agent. The data capture agent may use receipt time of the task instructions as the start of a new task event.

At 380, the data capture agent receives synthetic source data streamed from the substitute task environment (see operation 340 in FIG. 3A and Example IV.A). The data capture agent associates the synthetic source data with the current task event. The synthetic source data can include, for example, synthetic source image data streamed from a camera worn by the substitute agent (see operation 340 in FIG. 3A and Example IV.A) and sensor data streamed from sensors coupled to the substitute agent or sensors in the substitute task environment (see operation 340 FIG. 3A and Example IV.A). The sensor data may include hand sensor data outputted by sensors coupled to the hand(s) of the substitute agent.

At 390, the data capture agent may augment the synthetic source data captured from the substitute task environment. The data capture agent may apply timestamps to the synthetic source data. The data capture agent may generate other types of data to augment the synthetic source data (e.g., data can be generated based on at least a portion of the task instructions associated with the current task event; metadata can be generated to facilitate processing of the synthetic source data). The data capture agent may combine the augmentation data (or otherwise associate the augmentation data) with the synthetic source data.

At 395, the data capture agent may store the synthetic source data (which may include any augmentation data generated in operation 390) in a database for the current task event. The stored synthetic source data can be used to produce synthetic robot data as described in Examples V, VI.A, and VI.B.

Example V—Synthetic Robot Data Generation System

Figure 4:
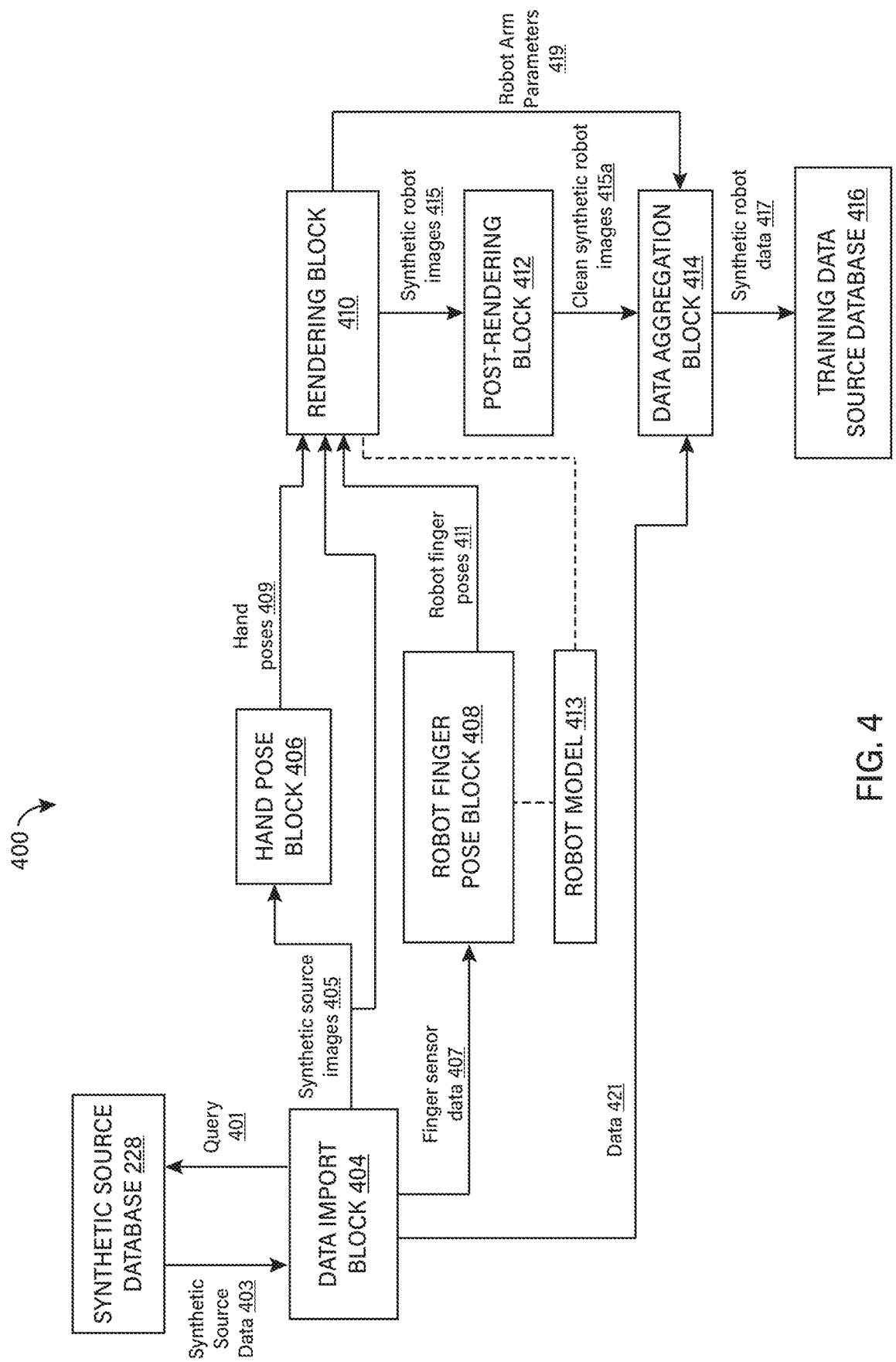
FIG. 4 is a block diagram illustrating a system for generating synthetic robot data from synthetic source data.

FIG. 4 illustrates an example system 400 that may be used to produce synthetic robot data based on synthetic source data. The synthetic robot data may be used to prepare training data for an AI model to learn a policy (e.g., as described in Examples VIII.A to VII.C).

The system 400 may include a data import block 404 that can send a query 401 to the synthetic source database (228 in FIGS. 2A and 2B) for synthetic source data associated with a task event. The data import block 404 can receive synthetic source data 403 for the task event, which may be, for example, the next unprocessed task event in the database or the most recent task event stored in the database.

The synthetic source data 403 may be generated as described in Examples IV.A and IV.B. In some examples, the synthetic source data 403 can include synthetic source image data and synthetic source sensor data. The synthetic source image data may be egocentric image data captured from the viewpoint of a substitute agent. The synthetic source sensor data may include hand sensor data captured from sensor coupled to a hand of the substitute agent. The synthetic source data may include other augmentation data such as metadata generated by the data capture agent and task instructions associated with the task event.

In some examples, the data import block 404 may identify a sequence of synthetic source images 405 from the synthetic source image data. The synthetic source images 405 may be egocentric images. The synthetic source images may be frames of one or more videos. A synthetic source image 405 may include subject arm object(s) (corresponding to subject arm(s) associated with the task event) and a background (corresponding to an environmental scene associated with the task event).

In some examples, the data import block 404 may identify sets of finger sensor data 407 from the hand sensor data included in the synthetic source sensor data. Finger sensor data are data collected from sensors coupled to the fingers of a hand. The sets of finger sensor data 407 may be identified from the hand sensor data by temporally matching portions of the hand sensor data to the synthetic source image data such that each set of finger sensor data corresponds temporally to one of the synthetic source images in the sequence of synthetic source images.

The system 400 may include a hand pose block 406 that can take a sequence of synthetic source images 405 as input and output a set of hand poses 409 (the hand pose block may take the synthetic source images one at a time and output a hand pose one at a time). The hand pose block 406 may output a hand pose 409 for each subject arm object in a synthetic source image. In some examples, each hand pose 409 can include 3D coordinates of joints in the hand (e.g., coordinates of the wrist, knuckles, and fingertips). A wrist pose in a coordinate frame of the camera used in capturing the synthetic source image data (hereafter, camera frame) may be extracted from the hand pose 409.

The hand pose block 406 may use any suitable hand pose estimation method to determine a hand pose for a subject arm object in a synthetic source image 405. In one example, the hand pose block 406 may use a deep learning model to determine the hand pose for the subject arm object. One example of a deep learning model that may be used is HaMeR, which stands for "Hand Mesh Recovery" (see Pavlakos, G., Shan, D., Radosavovic, I., Kanazawa, A., Fouhey, D., & Malik, J. (2024). Reconstructing hands in 3d with transformers. arXiv:2312.05251). HaMeR uses a transformer network to reconstruct a 3D hand mesh from a single 2D image.

In some examples, a subject arm object in a synthetic source image 405 may correspond to a subject arm configured as a chroma key arm. In these examples, the subject arm object can have a distinct color characteristic relative to the background of the synthetic source image, where the distinct color characteristic comes from the chroma key material used in configuring the chroma key arm. The hand pose block 406 may take advantage of the distinct color characteristic of the subject arm object to reliably identify the subject arm object in the synthetic source image when estimating a hand pose for the subject arm object.

In some examples, the system 400 may include a robot finger pose block 408 that can receive sets of finger sensor data 407 as input and output sets of finger poses 411 for a robot model 413 (the robot finger pose block may take the sets of finger sensor data one set at a time and output a set of finger poses for each set of finger sensor data). The robot finger pose block 408 may receive the robot model 413 as input or access the robot model 413 or include the robot model 413. The robot model 413 may be a mesh model representing a robot (or a part thereof). Each finger pose 411 can be a set of joint angles (e.g., joint actuator positions) for a finger.

Each set of finger sensor data 407 can correspond temporally to one of the synthetic source images 405. For a given set of finger sensor data 407, a respective set of finger poses 411 may be determined, for example, using an inverse kinematics solver to determine the joint parameters that would produce the finger positions represented in the set of finger sensor data 407 for the robot model 413. In another example, a set of finger poses 411 may be determined using a machine learning model trained to take as input a set finger sensor data 407 and the robot model 413 and output a set of finger poses 411 for the robot model 413.

The system 400 includes a rendering block 410 that can take the sequence of synthetic source images 405, the sets of finger poses 411 outputted by the robot finger pose block 408, and a set of hand poses 409 outputted by the hand pose block 406 as inputs and output a sequence of synthetic robot images 415. Each set of finger poses 411 is associated with one of the synthetic source images 405, and each hand pose 409 is associated with one of the synthetic source images 405. The rendering block 410 can determine a set of robot arm parameters 419 for each synthetic source image 405 based on the associated set of finger poses 411 and hand pose 409. The rendering block 410 can render an image of a robot arm object based on the respective set of robot arm parameters 419 and a robot model (e.g., the robot model 413). The rendering block 410 can composite the image of the robot arm object with the respective synthetic source image 405 to obtain a synthetic robot image 415 including the robot arm object and a background of the respective synthetic source image 405 (the robot arm object is superimposed on the respective subject arm object in the respective synthetic source image). The sequence of synthetic robot image 415 can be formed from the synthetic robot images 415 generated by compositing robot arm objects with the sequence of synthetic source images 405.

The system 400 may include a post-rendering block 412 that takes the sequence of synthetic robot images 415 as input and outputs clean synthetic robot images 415a. In some examples, the clean synthetic robot images 415a may be versions of the synthetic robot images 415 without residues of subject arm objects. For example, the robot arm objects may not completely cover the subject arm objects in the version of the synthetic robot images outputted by the rendering block 410, leaving residues of the subject arm objects in the synthetic robot images. The post-rendering block 412 may be used to remove these residues. In some examples, the post-rendering block 412 may use in-painting techniques to identify a portion of the synthetic robot image 415 containing pixels of a subject arm object and replace the portion with other image information (e.g., color information sampled from neighboring pixels or pixels in the background of the image). In some examples, the subject arm object may have a distinct color characteristic from a chroma key material, and the post-rendering block 412 may take advantage of the distinct color characteristic to identify the portion of the synthetic robot image containing pixels of the subject arm object.

The system 400 may include a data aggregation block 414 that prepares synthetic robot data 417 for output from the system. The data aggregation block 414 may receive the sequence of clean synthetic robot images 415a (e.g., from the post-rendering block 412) and the sets of robot arm parameters 419 (e.g., from the rendering block 410). Each set of robot arm parameters 419 is associated with one of the clean synthetic robot images 415a (e.g., the set of robot arm parameters 419 is used to render the robot arm object in the associated clean synthetic robot image). The set of robot arm parameters for a robot arm object can include, for example, a hand pose (or a wrist pose obtained from the hand pose, or both a hand pose and a wrist pose) and a set of finger poses. The data aggregation block 414 may form a plurality of data records from the inputs and include them in the synthetic robot data 417. Each data record may include a synthetic robot image 415a and a corresponding set of robot arm parameters.

The data aggregation block 414 may receive additional data 421 from the data import block 404 and may add at least some of the additional data 421 to the synthetic robot data 417. The additional data 421 may be data extracted or derived from the synthetic source data 403 or from augmentation data accompanying the synthetic source data 403. For example, the additional data 421 may include any combination of sensor data collected for the task event, metadata generated for the task event, or task instructions executed during the task event.

The system 400 may store the synthetic robot data 417 in a training data source database 416. Training data for an AI model to learn a policy may be generated at least in part with the synthetic robot data 417.

The blocks 404, 406, 408, 410, 412, 414 may be processes running on a computing system, which may communicate with the data collection environment (203 in FIGS. 2A-2B) through any suitable messaging or communication service. The computing system may include a non-transitory computer readable storage medium (or memory) that may have program instructions stored thereon that are executable by a processor. The computing system may include one or more processors to execute program instructions stored in the memory.

Example VI.A—Synthetic Robot Data Generation Method

Figure 5A:
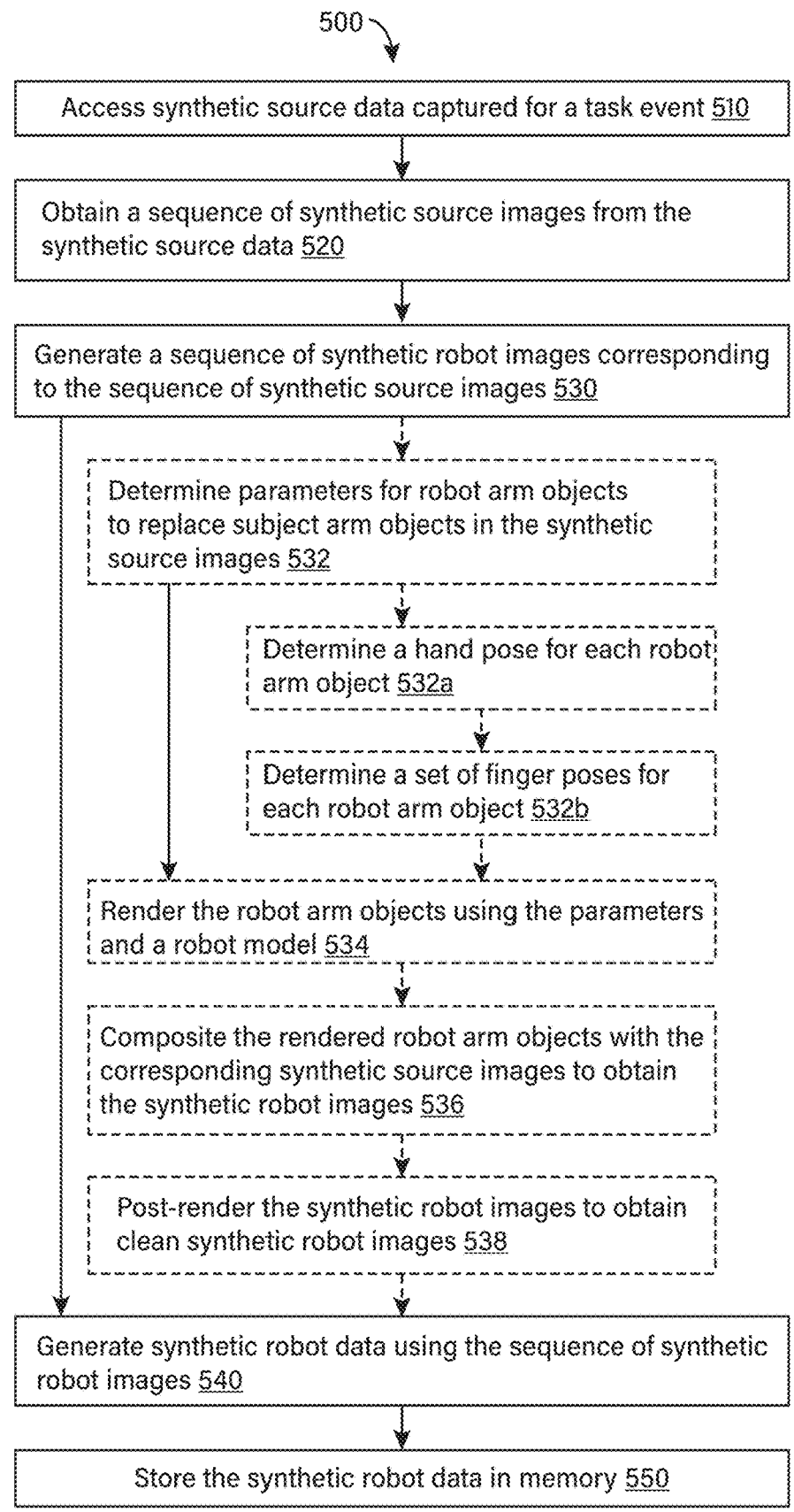
FIG. 5A is a flow diagram of a method of generating synthetic robot data from synthetic source data.

FIG. 5A is a flow diagram illustrating a method 500 for generating synthetic robot data. The method 500 may be performed using the system 400 described in Example V. The operations in FIG. 5A may be reordered and/or repeated as desired and appropriate.

At 510, the method can include accessing synthetic source data captured for a task event. The synthetic source data may be received in response to a query to a synthetic source database containing synthetic source data for task events or may be received automatically when a new task event is recorded in the synthetic source database.

The synthetic source data can include synthetic source image data captured by a camera of an environmental scene in which a substitute agent (e.g., a human agent) performs a task. In some examples, the substitute agent may perform the task using chroma key arm(s). Each chroma key arm may be formed by inserting one of the subject arms of the substitute agent in a chroma glove as described in Example III. The synthetic source image data may be egocentric image data (e.g., image data captured from an egocentric viewpoint of the substitute agent) as described in Example III.

The synthetic source data may include sensor data outputted by sensors coupled to the hand(s) of the substitute agent (hereafter, hand sensor data). In some examples, the hand sensor data can include finger sensor data (i.e., sensor data from sensors coupled to the fingers of the hand of the substitute agent). The finger sensor data can represent finger movements. In some examples, the finger sensor data can represent fingertip positions relative to the wrist. The hand sensor data may include other types of sensor data (e.g., tactile sensor data).

The synthetic source data may include other data associated with the task event, such as metadata generated by a data capture agent and task instructions executed during the task event.

At 520, the method can include obtaining a sequence of synthetic source images from the synthetic source image data. The synthetic source images may be egocentric images (e.g., images captured from an egocentric viewpoint of the synthetic source agent). In some examples, the synthetic source images may be frames of one or more videos in the synthetic source image data (e.g., the camera used in capturing the synthetic source image data may be a video camera).

A synthetic source image can have subject arm object(s) corresponding to subject arm(s) of the substitute agent and a background corresponding to the environmental scene. If the subject arm(s) are configured as chroma key arm(s), pixels (or image portion) corresponding to the subject arm object(s) can have a distinct color characteristic of the chroma key material used in forming the chroma key arm(s). In examples where the synthetic source image may have two subject arm objects, pixels corresponding to the two subject arm objects may have different distinct color characteristics so that the two subject arm objects may be distinguished from each other and from the background.

At 530, the method can include generating a sequence of synthetic robot images corresponding to the sequence of synthetic source images. The method may include identifying a set of subject arm objects in the sequence of synthetic source images. The method may include generating a set of robot arm objects to replace the set of subject arm objects. Each robot arm object may be associated with one of the synthetic source images via correspondence of the robot arm object to one of the subject arm objects. A robot arm object may be composited with an associated synthetic source image to obtain a synthetic robot image in which the robot arm object replaces the subject arm object. Operation 530 may be performed using any combination of operations 532 to 536.

At 532, operation 530 may include determining robot arm parameters to use in rendering robot arm objects that can replace the subject arm objects in the synthetic robot images. Examples of robot arm parameters that may be determined are hand pose (or wrist pose) and finger poses.

At 532a, operation 532 may include determining a hand pose $hp_{ij}$ for each robot arm object. In one example, for each synthetic source image $X_i$, a 3D hand pose may be estimated for each subject arm object $s_{ij}$ in the synthetic source image. The 3D hand pose may be estimated using any suitable 3D hand pose estimation model, which may be a deep learning model. One example of a deep learning model that may be used is HaMeR, which stands for "Hand Mesh Recovery" (see, Pavlakos, G., Shan, D., Radosavovic, I., Kanazawa, A., Fouhey, D., & Malik, J. (2024).). HaMeR uses a transformer network to reconstruct a 3D hand mesh from a single 2D image. However, any other deep learning model that can estimate a 3D hand pose from a 2D image, or a 3D image if the synthetic source image is a 3D image containing color and depth information, may be used.

The 3D hand pose determined for the subject arm object $s_{ij}$ includes 3D coordinates of joints in the hand (e.g., coordinates of the wrist, knuckles, and fingertips). A wrist pose $wp_{ij}$ can be extracted from the 3D hand pose for the subject arm object $s_{ij}$. The wrist pose $wp_{ij}$ is a 3D position in the coordinate frame of the camera. In some examples, a set of finger poses may be extracted from the 3D hand pose. However, in some instances, the joint information in the 3D hand pose may not be sufficient to determine a complete set of finger poses (e.g., a finger may be occluded in the synthetic source image such that the 3D hand pose does not contain information for the joints in the occluded finger). In some examples, a more reliable method of obtaining finger poses may be based on hand sensor data.

At 532b, operation 532 may include determining a set of finger poses $fp_{ij}$ for each robot arm object $r_{ij}$ based on hand sensor data. In one example, operation 532b can include obtaining sets of finger sensor data $fs_{ij}$ from the hand sensor data in the synthetic source data accessed in operation 510. Each set of finger sensor data $fs_{ij}$ can correspond temporally to one of the synthetic source images $X_i$ in the sequence of synthetic source images obtained in operation 520. In one example, each set of finger sensor data $fs_{ij}$ may represent fingertip positions relative to the wrist.

For a synthetic source image $X_i$ having a subject arm object $s_{ij}$, a set of finger poses $fp_{ij}$ as a robot arm parameter for rendering a robot arm object $r_{ij}$ to replace the subject arm object $s_{ij}$ may be determined based on a set of finger sensor data $fs_{ij}$ corresponding temporally to the synthetic source image $X_i$. In one example, a set of finger poses $fp_{ij}$ may be calculated for a specified robot model using an inverse kinematics (IK) solver, where the corresponding set of finger sensor data $fs_{ij}$ can provide the joint constraints that the solver enforces. In another example, a set of finger poses $fp_{ij}$ may be predicted by a machine learning model trained to take a set of finger sensor data $fs_{ij}$ and a specified robot model as input and output a set of finger poses $fp_{ij}$. Each finger pose $fp_{ij}$ can be a set of joint angles (e.g., joint actuator positions) for a finger of a robot hand.

At 534, operation 530 may include rendering each of the robot arm objects $r_{ij}$ using the associated set of parameters determined in operation 532. For example, for each robot arm object $r_{ij}$ to be rendered, a robot arm model, a hand pose $h_{ij}$ (or wrist pose $wp_{ij}$ extracted from the hand pose $h_{ij}$), and a set of finger poses $fp_{ij}$ determined based on hand sensor data or extracted from the hand pose $h_{ij}$ may be provided as inputs to a rendering engine. The rendering engine may construct a 3D model of the robot arm object $r_{ij}$ based on the inputs and output an image $Y_{ij}$ of the robot arm object $r_{ij}$. The image $Y_{ij}$ may be have the same format as the synthetic source images $X_i$. For example, if the synthetic source images $X_i$ are 2D images with color data, the image $Y_{ij}$ can also be a 2D image with color data.

At 536, the operation 530 may include, for each robot arm object $r_{ij}$, compositing the image $Y_{ij}$ of the robot arm object $r_{ij}$ with the corresponding synthetic source image $X_i$ to obtain a synthetic robot image $Z_i$. In the image composition, the wrist pose of the robot arm object $r_{ij}$ is matched with the wrist pose of the corresponding subject arm object $s_{ij}$ in the camera frame so that at least some of the pixels corresponding to the subject arm object $s_{ij}$ are replaced by at least some of the pixels of the image $Y_{ij}$ of the robot arm object $r_{ij}$.

In some examples, all of the pixels of the subject arm object $s_{ij}$ may not be replaced by the pixels of the image $Y_{ij}$ of the robot arm object $r_{ij}$ (e.g., due to geometrical differences between the robot arm object and the subject arm object), leaving some pixels with the color characteristic of the subject arm object $s_{ij}$ in the synthetic robot image $Z_i$. In some examples, at 538, operation 530 may include post-rendering the synthetic robot image $Z_i$ to remove any remaining pixels corresponding to the subject arm object $s_{ij}$ from the synthetic robot image $Z_i$. For example, image in-painting techniques may be used to identify an image portion of the synthetic robot image Z; having pixels with a color characteristic of the subject arm object $s_{ij}$ and replace the image portion using information from neighboring pixels in the synthetic robot image $Z_i$ (or from pixels in the background of the synthetic robot image). In some example, the color characteristic of the subject arm object $s_{ij}$ may be a distinct color characteristic due to a chroma key material, which can facilitate identification of the portion of the synthetic robot image $Z_i$ to be replaced.

At 540, the method can include generating synthetic robot data including the sequence of synthetic robot images $Z_i$. The synthetic robot data can further include the sets of robot arm parameters used in generating the robot arm objects in the synthetic robot images $Z_i$. A set of robot arm parameters can, for example, include a hand pose $h_{ij}$ or a wrist pose $wp_{ij}$ (or both a hand pose and a wrist pose) and a set of finger poses $fp_{ij}$ associated with a robot arm object in a synthetic robot image $Z_i$. In some examples, the synthetic robot data may include a plurality of data records formed from the synthetic robot images $Z_i$ and the sets of robot arm parameters. Each data record may include a synthetic robot image $Z_i$ and a set of robot arm parameters used in rendering a robot arm object in the synthetic robot image. In some examples, the synthetic robot data may include portions of the synthetic source data (e.g., any combination of the hand sensor data (or parts thereof) and augmentation data (e.g., metadata and task instructions)).

At 550, the method can include storing the synthetic robot data in memory (e.g., in a database or data store in memory). A training dataset for an AI model to learn a policy may be generated at least in part with at least a portion of the synthetic robot data.

Figure 5B:
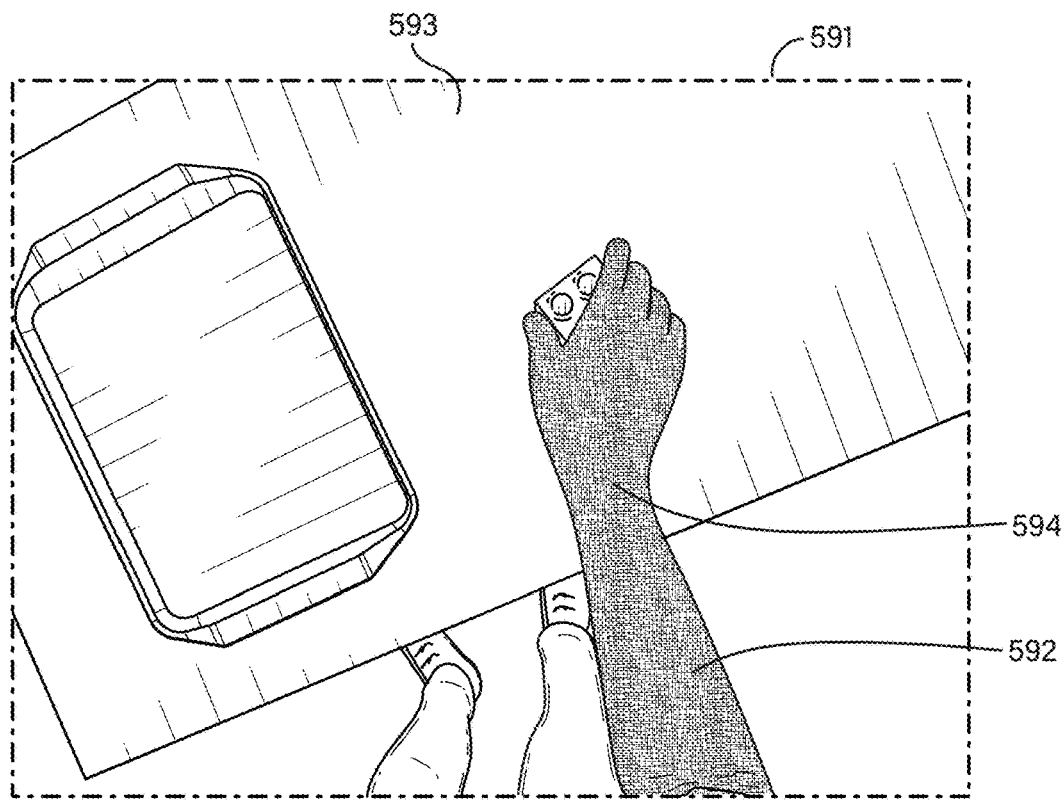
FIG. 5B is a schematic of an example synthetic source image.
Figure 5C:
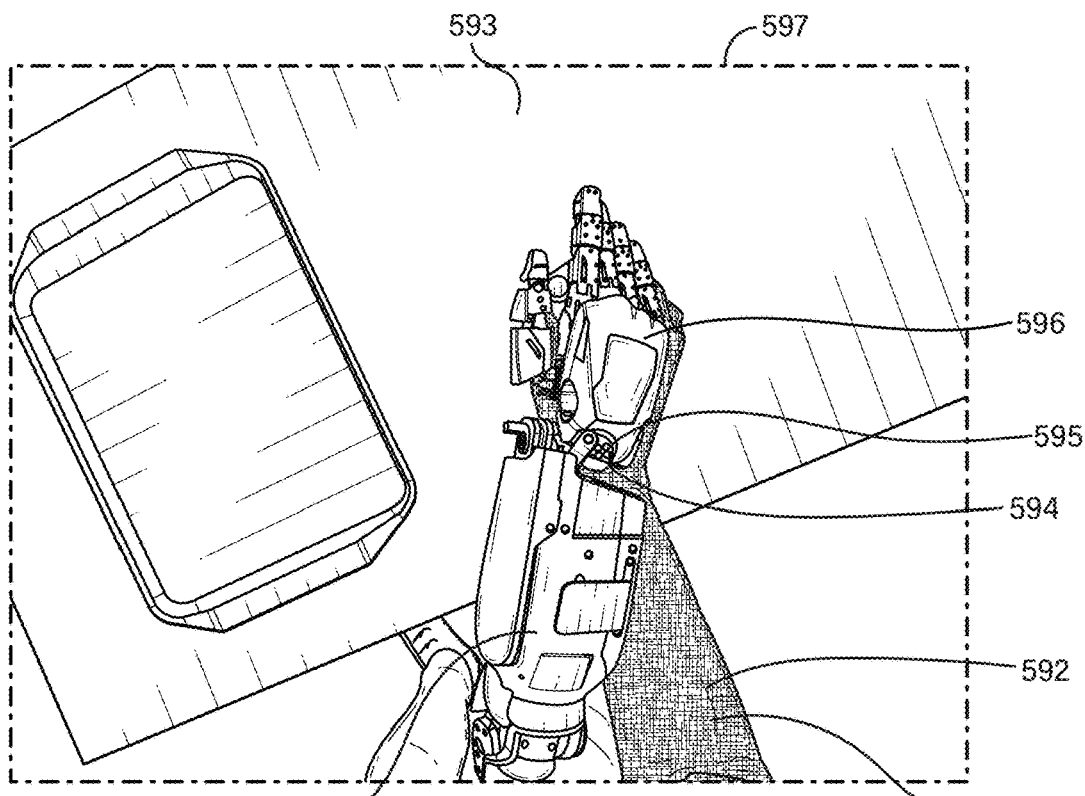
FIG. 5C is a schematic of a robot arm object composited with the synthetic source image shown in FIG. 5B to form a synthetic robot image.

For illustration purposes, FIG. 5B shows a synthetic source image 591 including a subject arm object 592 corresponding to a subject arm used in performing a task and a background 593 corresponding to an environmental scene in which the task is performed with the subject arm. In FIG. 5C, a robot arm object 596 is composited with the synthetic source image 591 to form a synthetic robot image 597 as described in operation 530 in FIG. 5A. The compositing includes overlaying the robot arm object 596 on the synthetic source image 591, with a position of the wrist 595 of the robot arm object 596 matched with a position of the wrist 594 of the subject arm object 592. Since the robot arm object 596 has the same wrist pose as the subject arm object 592, the hand of the robot arm object 596 overlaps the hand of the subject arm object 592.

Figure 5D:
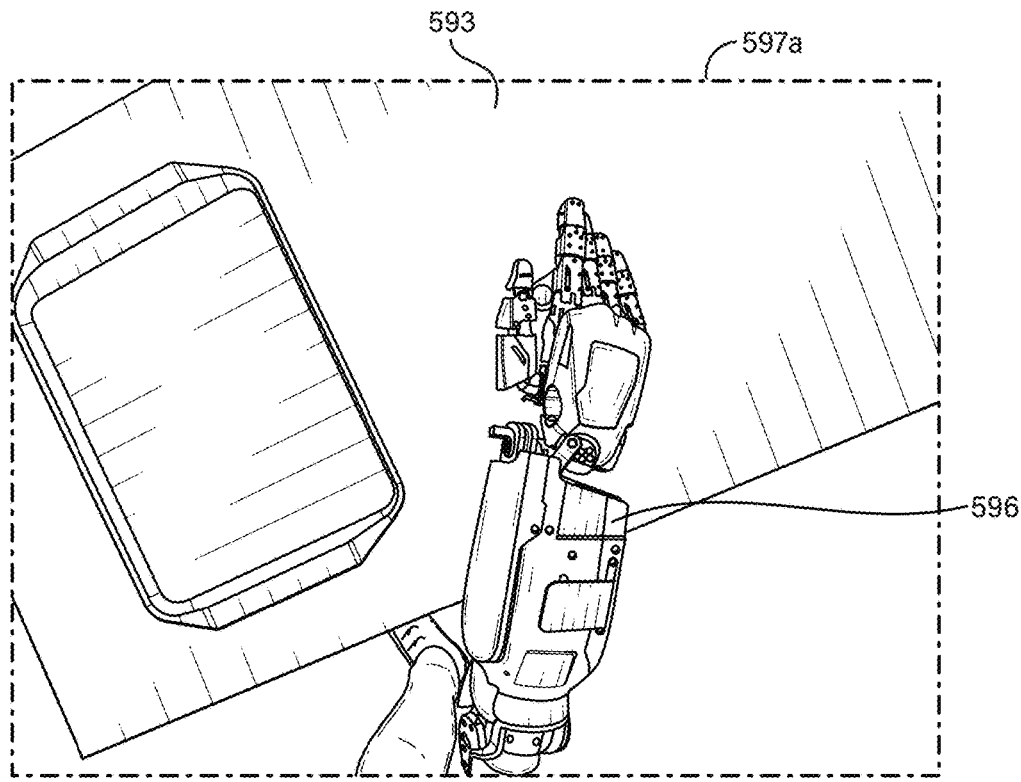
FIG. 5D is a schematic of a clean visualization of the synthetic robot image shown in FIG. 5C.

As can be observed in FIG. 5C, the robot arm object 596 may not completely cover the subject arm object 592 (e.g., due to differences in geometries of the robot arm object 595 and the subject arm object 592 or due to differences in wrist orientations of the robot arm object 595 and the subject arm object 592). The remaining visible parts (or residue) of the subject arm object 592 in the synthetic robot image 597 can be removed and replaced by post-rendering. FIG. 5D shows the clean synthetic robot image 597a without residue of the subject arm object.

Example VI.B—Synthetic Robot Data Generation Method

Figure 6A:
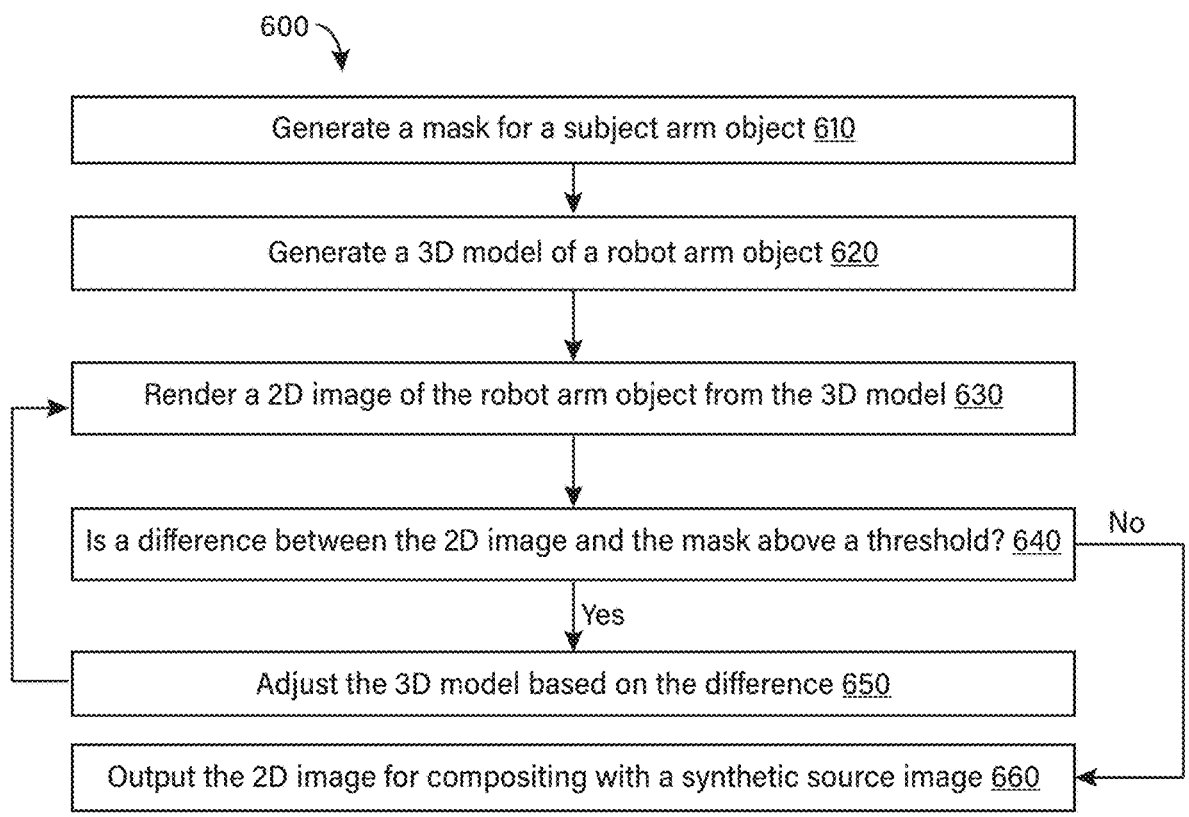
FIG. 6A is a flow diagram of a method of rendering a robot arm object.

FIG. 6A illustrates a method 600 of rendering a robot arm object that may be composited with a synthetic source image to form a synthetic robot image. The method 600 can render a robot arm object having a wrist orientation that substantially matches a wrist orientation of the subject arm object to be replaced by the robot arm object. The method 600 may replace the operation 534 in the method 500 described in Example VI.A. The operations in FIG. 6A may be reordered and/or repeated as desired and appropriate.

Figure 6B:
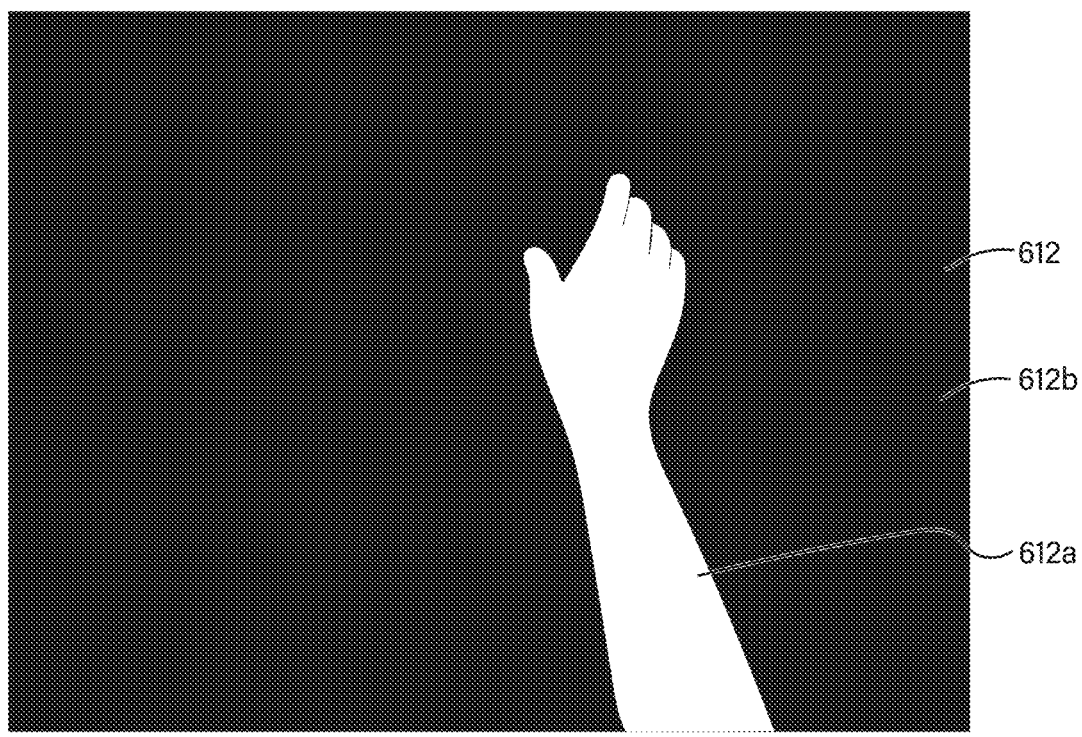
FIG. 6B is a schematic of a mask obtained from the synthetic source image shown in FIG. 5B.

Referring to FIG. 6A, at 610, the method can include generating a mask $m_{ij}$ from a synthetic source image $X_i$ including the subject arm object $s_{ij}$ to be replaced with a robot arm object $r_{ij}$. In one example, the mask $m_{ij}$ may be a binary image. In one example, a process for generating the mask can include identifying the pixels corresponding to the subject arm object $s_{ij}$ in the synthetic source image $X_i$. If the subject arm object corresponds to a subject arm configured as a chroma key arm, a distinct color characteristic of the subject arm object $s_{ij}$ may be used to identify the pixels corresponding to the subject arm object. The pixels corresponding to the subject arm object $s_{ij}$ can be assigned a first value, and the remaining pixels (e.g., the pixels corresponding to the background) can be assigned a second value. The first and second values are different. For example, the first value may be 1 while the second value is 0, or vice versa. The mask $m_{ij}$ has the effect of highlighting the subject arm object $s_{ij}$. FIG. 6B shows an example of a mask 612 generated from the synthetic source image 591 in FIG. 5B. The pixels corresponding to the subject arm object 612a (592 in FIG. 5B) have a first value, and the pixels corresponding to the background 612b (593 in FIG. 5B) have a second value.

At 620 in FIG. 6A, the method can include generating a 3D model of the robot arm object $r_{ij}$. For example, the 3D model can be generated based on a given robot arm model (e.g., a mesh model representing a robot arm) and a set of robot arm parameters determined for the robot arm object $r_{ij}$ (see operation 532a in Example VI.A). The robot arm parameters can include a hand pose $h_{ij}$ or a wrist pose $wp_{ij}$ obtained from the hand pose $h_{ij}$ (or both a hand pose and a wrist pose) and a set of finger poses $fp_{ij}$ (determined based on hand sensor data or obtained from the hand pose $h_{ij}$). The robot arm parameters can also include wrist orientation, which may be assigned an initial value. For example, the initial wrist orientation may be a neutral wrist orientation (e.g., corresponding to when the wrist is straight or slightly bent relative to the proximal arm).

Figure 6C:
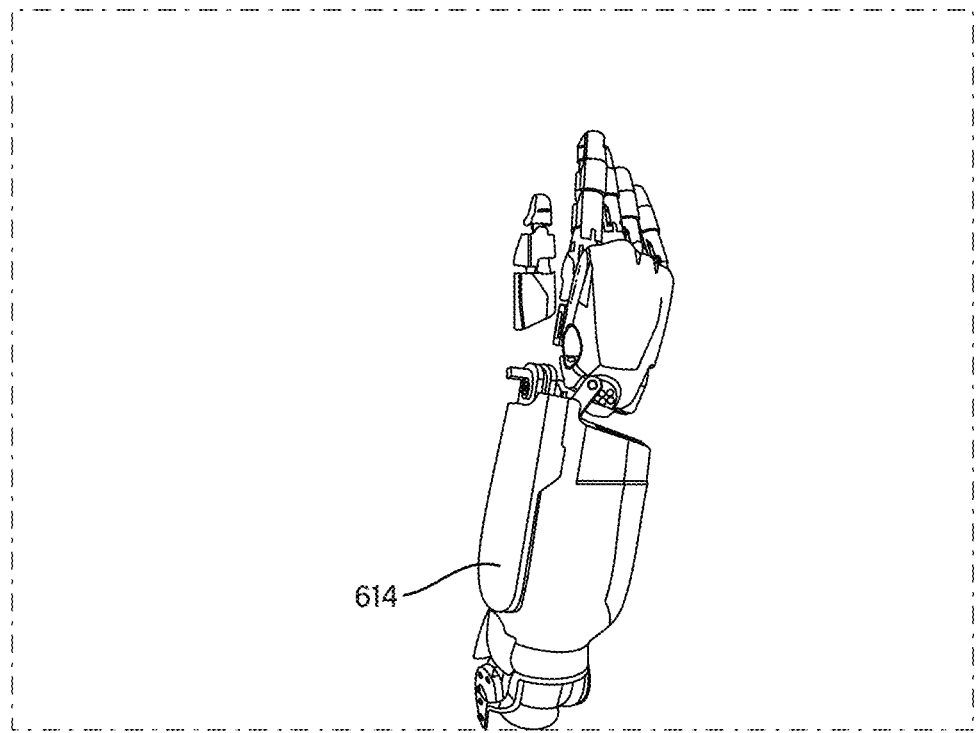
FIG. 6C is a 2D image of a robot arm object rendered from a 3D model of a robot arm.

At 630, the method can include rendering a 2D image from the 3D model of the robot arm object $r_{ij}$. Both the 2D image rendered in operation 630 and the mask $m_{ij}$ generated in operation 610 can be in the same camera frame. FIG. 6C shows an example 2D image 614 of a robot arm object rendered from a 3D model.

Figure 6D:
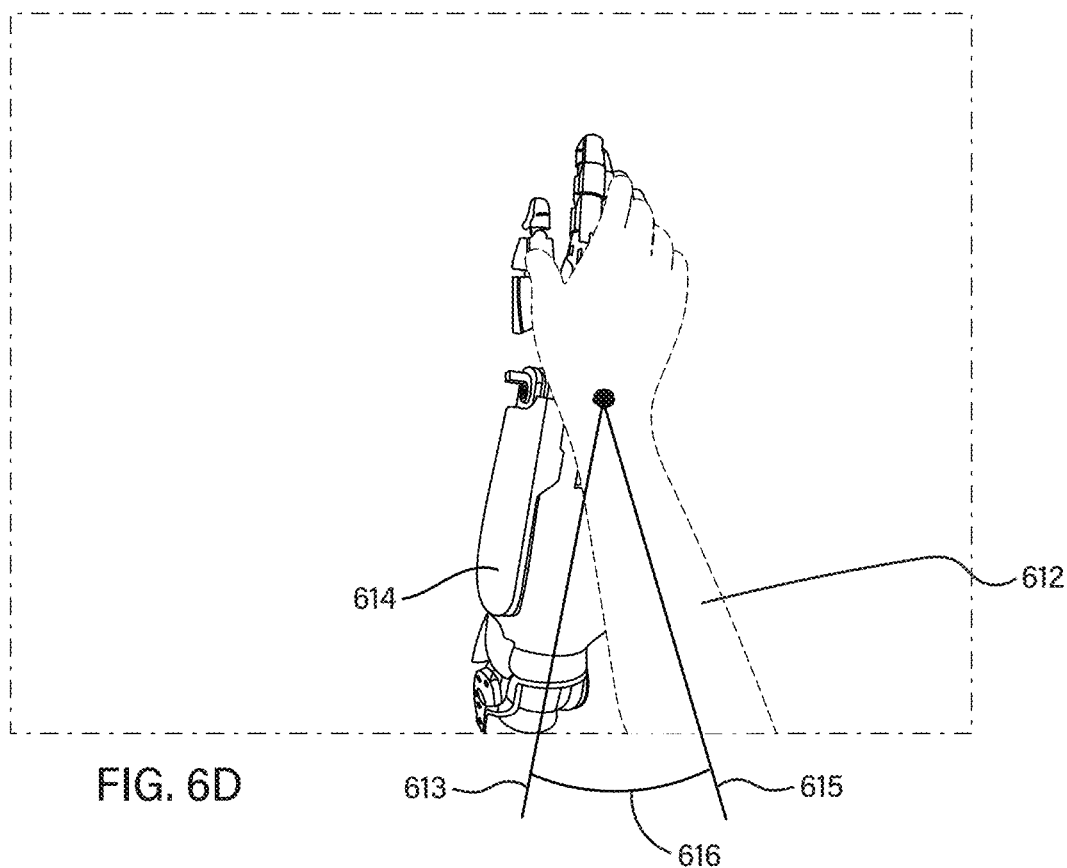
FIG. 6D is a schematic illustrating a difference in wrist orientations between a subject arm object highlighted by the mask image shown in FIG. 6B and the robot arm object in the 2D image shown in FIG. 6C.

At 640 in FIG. 6A, the method can include applying the mask $m_{ij}$ to the 2D image and determining a difference between the subject arm object in the mask $m_{ij}$ and the robot arm object in the 2D image. FIG. 6D shows the mask 612 overlaid on the 2D image 614 (with the wrist poses of the subject arm object in the mask 612 and the robot arm object in the 2D image 612 matched). Line 613 indicates a wrist orientation of the robot arm object. Line 615 indicates a wrist orientation of the subject arm object. A difference between the wrist orientations 613, 615 is indicated by 616. In some examples, if the difference 616 is above a threshold, the method may continue at 650 (in FIG. 6A). If the difference 616 is not above a threshold, the method continues at 660 (in FIG. 6A).

At 650 in FIG. 6A, the method can include adjusting the 3D model of the robot arm object $r_{ij}$ based on the difference determined in operation 640. In some examples, some of the robot arm parameters for the robot arm object (e.g., the hand pose or wrist pose and the finger poses) may be fixed, while the wrist orientation of the robot arm object may be adjusted to minimize the difference determined in operation 640. The method may return to operation 630.

Figure 6E:
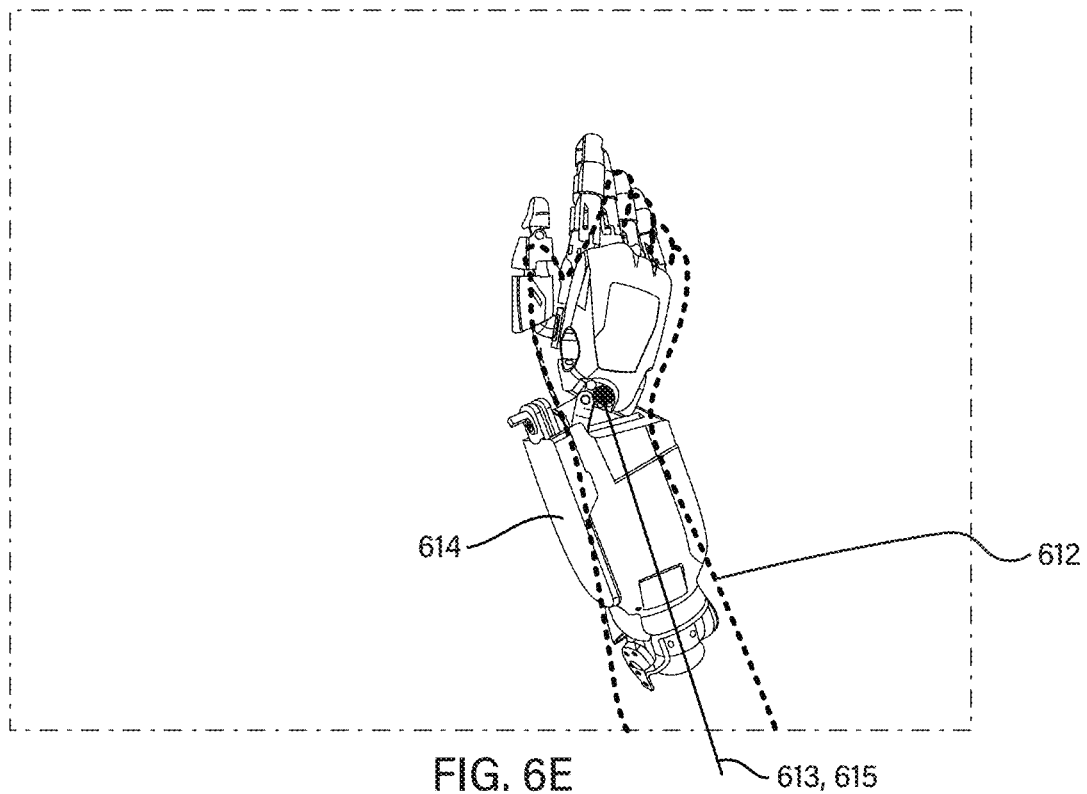
FIG. 6E is a schematic illustrating a minimized difference in wrist orientations between the subject arm object and the robot arm object shown in FIG. 6D.
Figure 6F:
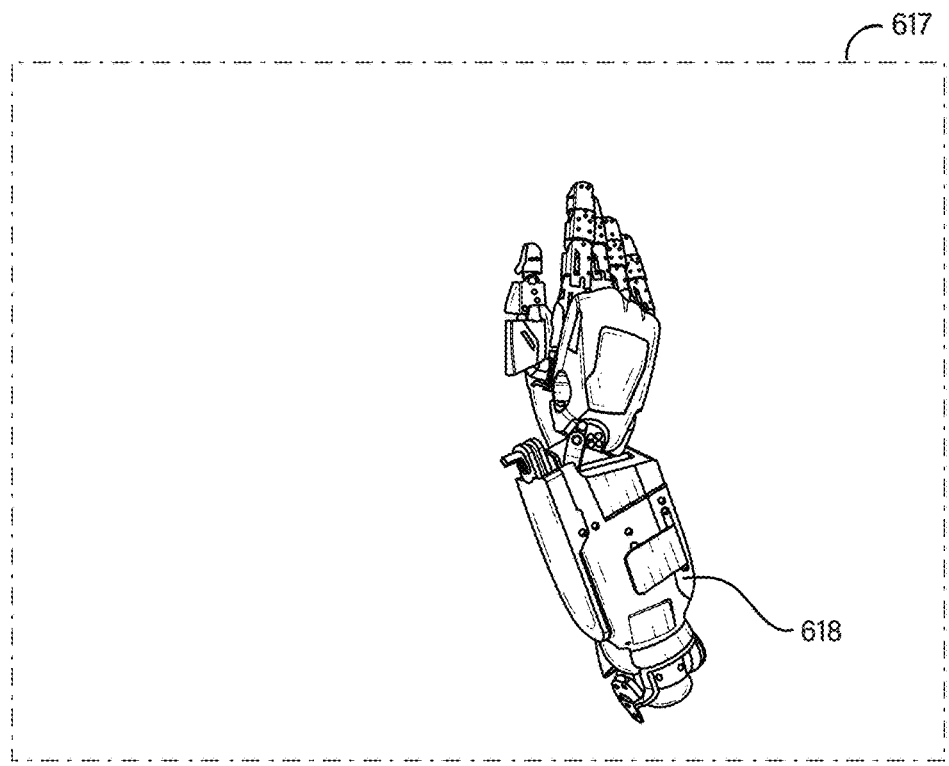
FIG. 6F is a rendered image of a robot arm object with an optimized wrist orientation.

At 660, the method may include outputting the 2D image rendered from the 3D model when the difference determined in operation 640 is not above the threshold. FIG. 6E show the 2D image 614 relative to the mask 612 when the difference in wrist orientations between the robot arm object in the 2D image 614 and the subject arm object in the mask 612 is below the threshold. In FIG. 6E, the angle 616 previously shown in FIG. 6D is now substantially equal to zero, which means that the wrist orientations 613, 615 of the robot arm object and the subject arm object are substantially aligned (or that the proximal arms of the robot arm object and subject arm object are substantially axially aligned). FIG. 6F shows a rendered image 617 including a robot arm object 618 that may be outputted in operation 660.

Figure 6G:
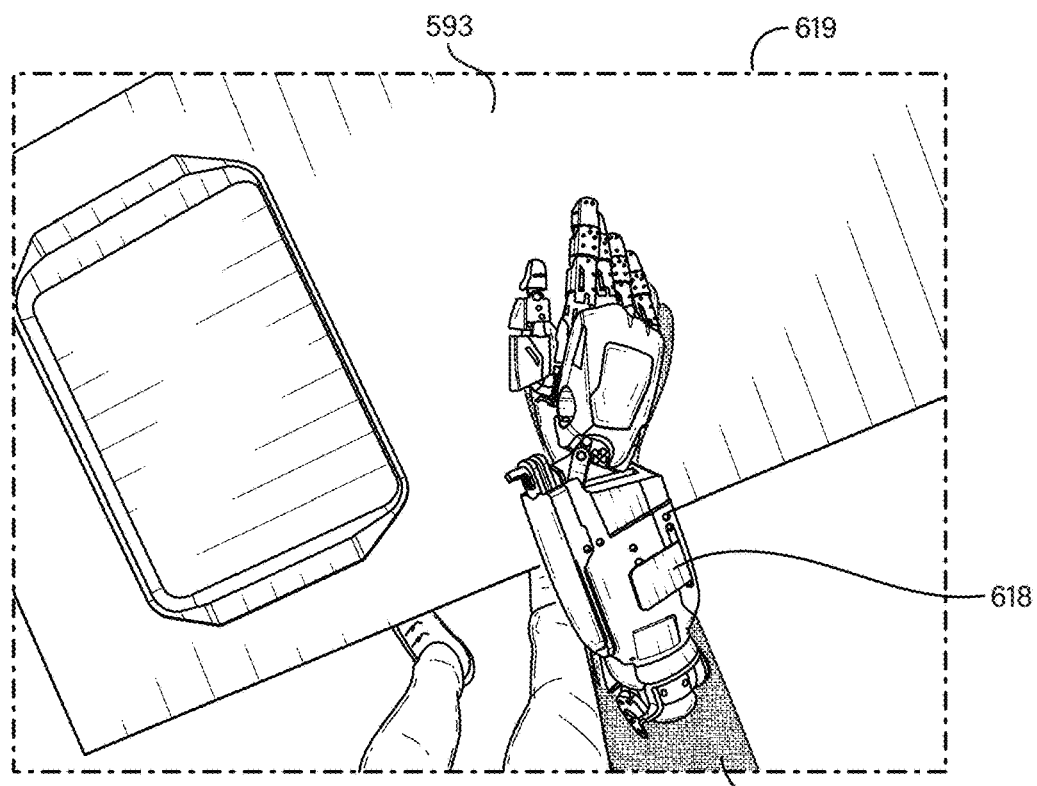
FIG. 6G is a schematic of a synthetic robot image formed by compositing the rendered image shown in FIG. 6F with the synthetic source image shown in FIG. 5B.

The rendered image 617 of the robot arm object $r_{ij}$ outputted in operation 660 can be composited with a corresponding synthetic source image to form a synthetic robot image (see operation 536 in Example VI.A and FIG. 5A). FIG. 6G shows a synthetic robot image 619 formed by compositing the rendered image 617 in FIG. 6F with the synthetic source image 591 in FIG. 5B. The residue of the subject arm object 592 in the synthetic robot image 619 can be removed by post-rendering (see operation 538 in Example VI.A).

The operations 610-660 may be repeated for each robot arm object $r_{ij}$ to be composited with a synthetic source image. The method 600 may be used in operation 534 of the method 500 in Example VI.A to obtain synthetic robot images with robot arm objects having optimized wrist orientations.

In some examples, a differentiable renderer may be trained to perform operations 620 to 660. A differentiable renderer is a specialized type of rendering engine that renders images from 3D scene descriptions and computes gradients of the rendered images with respect to input parameters such as geometry, texture, lighting, and camera settings. These gradients enable optimization and learning processes since they allow the renderer to be integrated into gradient-based frameworks like neural networks.

The differential renderer may be trained to take as inputs a mask highlighting a subject arm object, a set of robot arm parameters for a robot arm object, and a robot arm model as inputs and output a rendered image of the robot arm object with an optimized wrist orientation (i.e., a wrist orientation substantially matching that of the subject arm object highlighted by the mask). In some examples, the robot arm model may be provided as a robot model from which the differential renderer can extract the robot arm model. The robot model (or robot arm model) may be in the form of a mesh model representing the robot (or robot arm).

Example VII—True Robot Data Generation System

Figure 7:
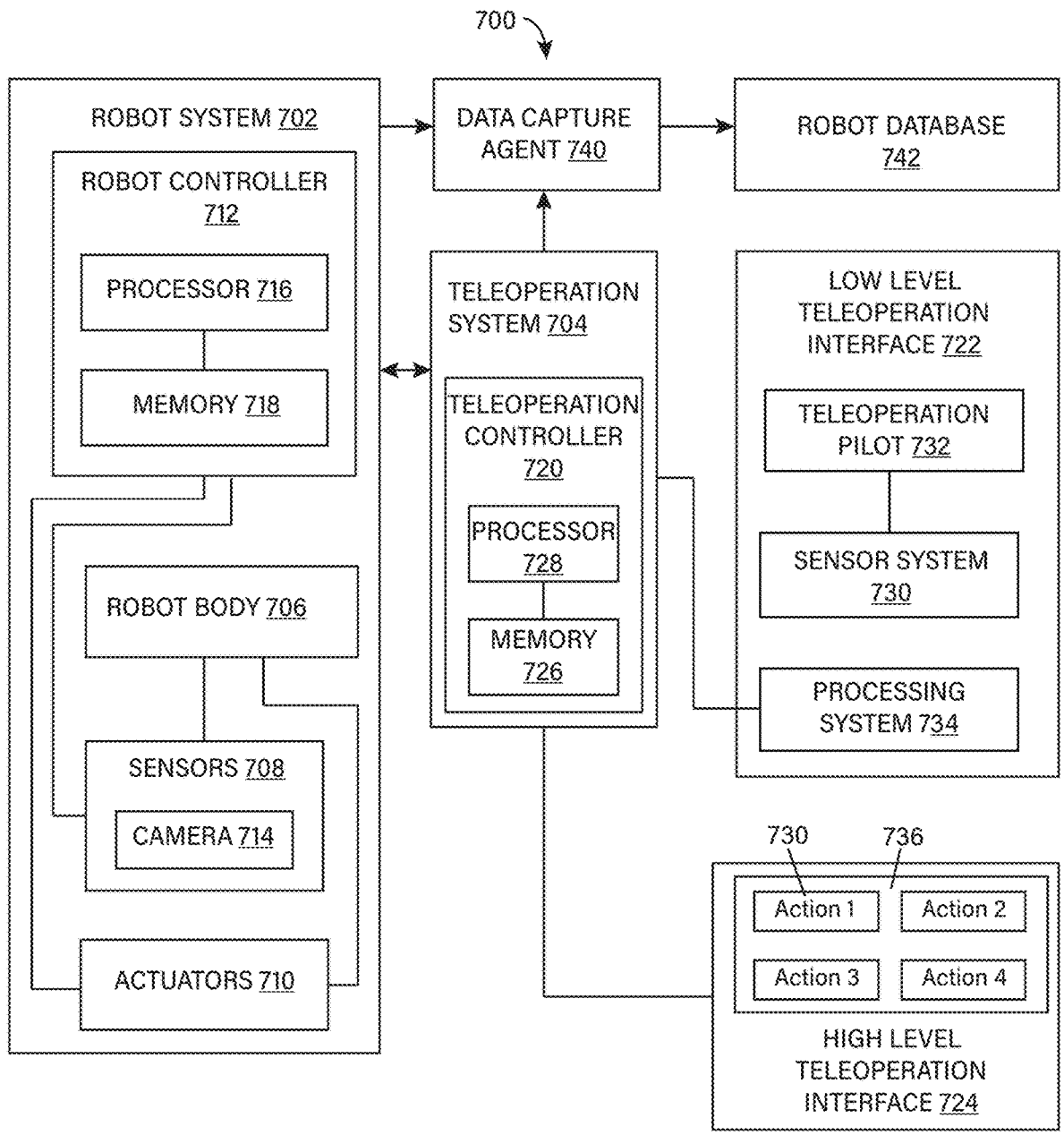
FIG. 7 is a block diagram of an example system for generating true robot data.

FIG. 7 is an example system 700 that may be used to generate true robot data (e.g., expert data collected directly with a robot).

The system 700 includes a robot system 702 communicatively coupled to a teleoperation system 704. The robot system 702 includes a robot body 706, a set of sensors 708 coupled to the robot body 706, a set of actuators 710 coupled to the robot body 706, and a robot controller 712. The robot body 706 may be any robot with at least one robot arm to perform a task. The robot body 706 may or may not be humanoid. The set of sensors 708 may include a camera 714 and various other types of sensors useful for recording information about the state of the robot body 706 or the state of the environment of the robot body 706. The set of actuators 710 include actuators that move various parts (or joints) of the robot body 706.

The robot controller 712 includes one or more processors 716 and one or more non-transitory processor-readable storage medium (memory) 718 communicatively coupled to the one or more processors 712. The robot controller 712 is communicatively coupled to the set of sensors 708 and the set of actuators 710. Parts of the robot controller 712 may be physically coupled to the robot body 706. Yet other parts of the robot controller 712 may be located remotely to the robot body 706. The robot controller 712 may include a communications interface (not shown separately) for communication with external systems, such as the teleoperation system 704.

The teleoperation system 704 includes a teleoperation controller 620, a low-level teleoperation interface 722, and a high-level teleoperation interface 724. The teleoperation controller 720 includes at least one non-transitory processor-readable storage medium (memory) 726, which can store processor-executable instructions, and at least one processor 728 that can execute the instructions. The teleoperation controller 720 includes a communication device (not shown separately) that enables the teleoperation controller 720 to transmit and receive signals from the robot controller 712.

The low-level teleoperation interface 722 includes a sensor system 730 that detects real physical actions performed by a teleoperation pilot 732 (e.g., a human pilot) and a processing system 734 that converts such real physical actions into low-level teleoperation instructions that, when executed by a processor, cause the robot body 706 to emulate the physical actions performed by the teleoperator 732. In some examples, the sensor system 730 may include sensory components typically employed in the field of virtual reality games, such as haptic gloves, accelerometer-based sensors worn on the body of the pilot, and a virtual reality (VR) headset that enables the pilot to see optical data collected by the sensory system of the robot system.

The high-level teleoperation interface 724 includes a graphical user interface (GUI) 736, which may be presented on any suitable display. In the illustrated example, the GUI 736 provides a set of buttons 730 corresponding to a set of actions performable by the robot body 706. Actions selected by a user/pilot of the high-level teleoperation interface 724 through the GUI 736 are converted into high-level teleoperation instructions that can be executed by the robot controller 712 to cause the robot body 706 to perform the selected actions.

In some examples, the robot body 606 can emulate or mimic human anatomy. In other examples, the robot body 706 may only partially emulate human anatomy. For example, the robot body 706 may include only a limited subset of human-like features. In other examples, the robot body 706 may not emulate human anatomy at all but may still be controllable by a human pilot (e.g., a movement of an arm of a human pilot may be translated into a movement of some part of the robot body that is not necessarily an arm).

The robot body 706 may be controlled to perform a task either through the low-level teleoperation interface 722 or the high-level teleoperation interface 724. As the robot body 706 performs the task, the set of sensors 708 can output sensor data representative of the operations of the robot body 706 or the environment of the robot. In some examples, the camera 714 can capture a scene of a task performed by the robot from an egocentric viewpoint of the robot (e.g., in a similar way to the camera 218 that captures a scene of a task performed by the substitute agent as described in Example III). The model of the camera 714 can be the same as the model of the camera 218 used in the substitute task environment (see Example III). The robot image data outputted by the camera 218 can be streamed to a data capture agent 740 for robot data.

In some examples, the teleoperation system 704 may also stream data to the data capture agent 740. For example, when a teleoperator makes a gesture that needs to be emulated by the robot, the trajectory of the robot to make the gesture needs to be determined. The trajectory that is used to control the robot may be streamed to the data capture agent 740 and associated with the data collected from the robot by the data capture agent 740. The set of trajectories may represent the task instructions for the task performed by the robot by emulating the teleoperation pilot.

The data capture agent 740 may store the robot data collected from the robot system 702 in a robot database 742. Data from the teleoperation system may also be stored in the robot database 742 in association with the robot data. The data stored in the robot database 742 may be processed and used to generate training data for training of an AI model.

Additional details of training a robot via teleoperation can be found in, for example, U.S. patent application Ser. No. 17/474,413 ("Teleoperation for Training of Robots using Machine Learning"), which is incorporated herein in its entirety by reference.

Example VIII.A—AI Model Training with Pre-Training and Fine-Tuning

Figure 8:
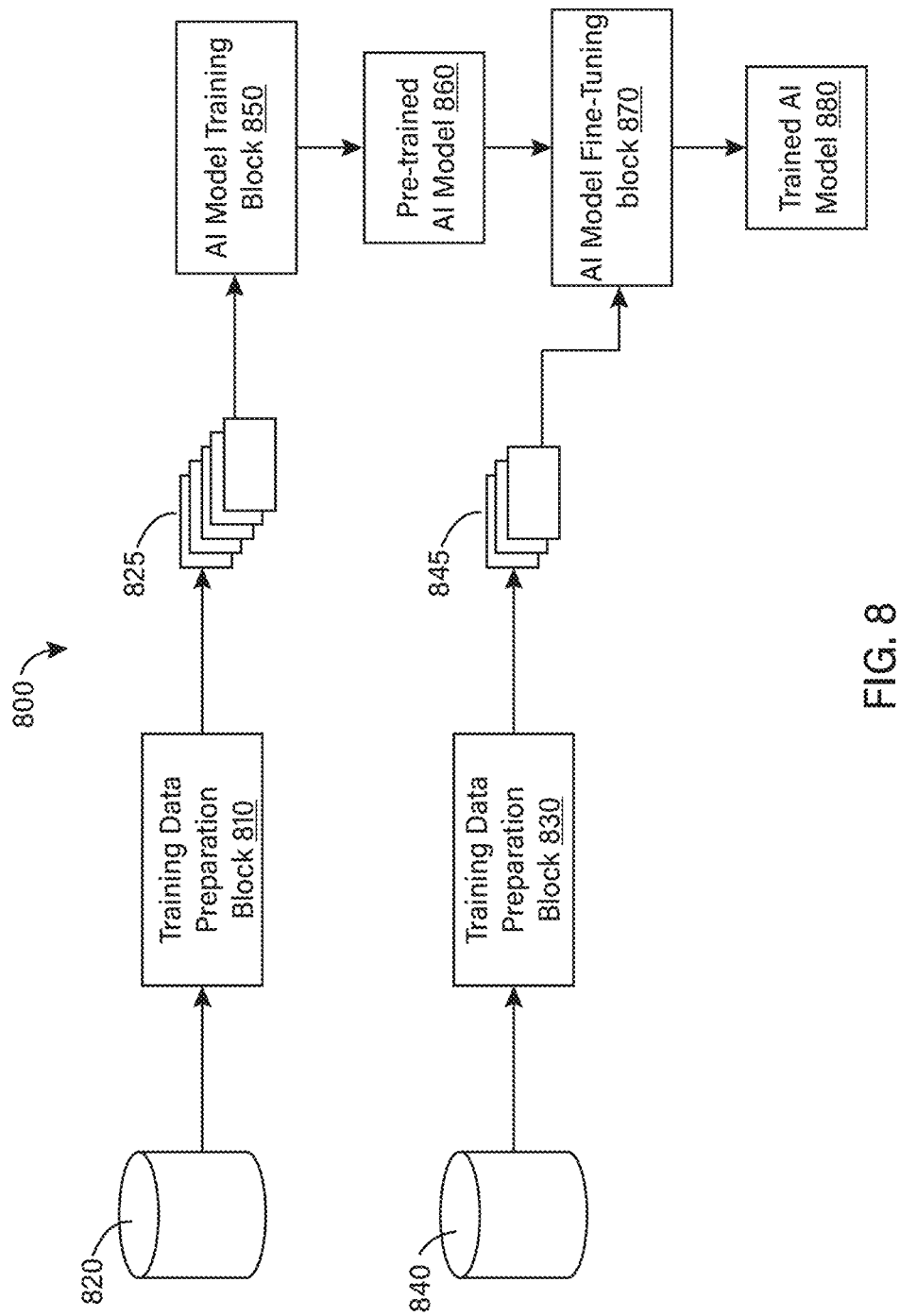
FIG. 8 is a block diagram illustrating an AI model training method with synthetic robot data for model pre-training and true robot data for model fine-tuning.

FIG. 8 is a block diagram illustrating an example AI model training method 800.

In a training data preparation block 810, synthetic robot data 820 are used to prepare a first training dataset 825. The synthetic robot data 820 may be produced from synthetic source data collected with a substitute agent as described in Examples V, VI.A, and VI.B.

The first training dataset 825 can include a plurality of training records (or training samples) prepared from the synthetic robot data 820. Each training record may include a synthetic robot image and a set of robot arm parameters for a robot arm object in the synthetic robot image. In one example, each training record may include a synthetic robot image, a wrist pose in a camera frame, and a set of finger poses, where the wrist pose and set of finger poses are derived from the set of robot arm parameters. A finger pose is a set of joint angles for a finger.

In a training data preparation block 830, true robot data 840 is used to prepare a second training dataset 845. The true robot data 840 can be expert data collected directly with a robot. The true robot data 830 may be collected, for example, using a teleoperation system such as described in Example VII.

The second training dataset 845 can include a plurality of training records prepared from the true robot data 840. Each training record may include a true robot image, a wrist pose in a camera frame, and a full robot joint pose. A full robot joint pose is a complete set of joint angles (or joint actuator positions) for all the joints on a robot. The robot assumes a particular posture in 3D space when the joints of the robot have the particular joint angles specified in the full robot joint pose.

The camera used in capturing the true robot images in the true robot data 940 may have the same model as the camera used in capturing synthetic source images from which the synthetic robot images in the synthetic robot data 820 are produced.

In some examples, the first training dataset 825 has a higher data volume compared to the second training dataset 845. For example, the number of training records in the first training dataset 825 is greater than the number of training records included in the second training dataset 845.

In a first AI model training block 850, an AI model is pre-trained on the first training dataset 825. Pre-training can include adjusting the parameters (e.g., neural network weights) of the model. The output of the first AI model training block 850 is a pre-trained AI model 860 that can accept an input image and predict a wrist pose in a camera frame and a set of finger poses.

In a second AI model training block 870, the pre-trained AI model 860 is fine-tuned on the second training dataset 845. Fine-tuning of the pre-trained AI model can include further adjusting the parameters of the model. The model can take advantage of the full robot joint pose to adjust its parameters specifically for the domain of the robot. The second AI model training block 870 outputs a trained AI model 880 that can accept an input image and predict a wrist pose in a camera frame and a set of finger poses.

Additional details of training a previously trained model can be found in, for example, U.S. patent application Ser. No. 17/495,544 ("Expedited Robot Teach-Through Initialization from Previously Trained System"), which is incorporated herein in its entirety by reference.

The AI model training is architecture independent. The AI model can be implemented using various generative or probabilistic modeling techniques, such as diffusion models, flow models, and variational autoencoders (VAEs). Model training can include adjusting weights or parameters of the model.

Example VII.B—Model Training with Mixed Training Data

Figure 9:
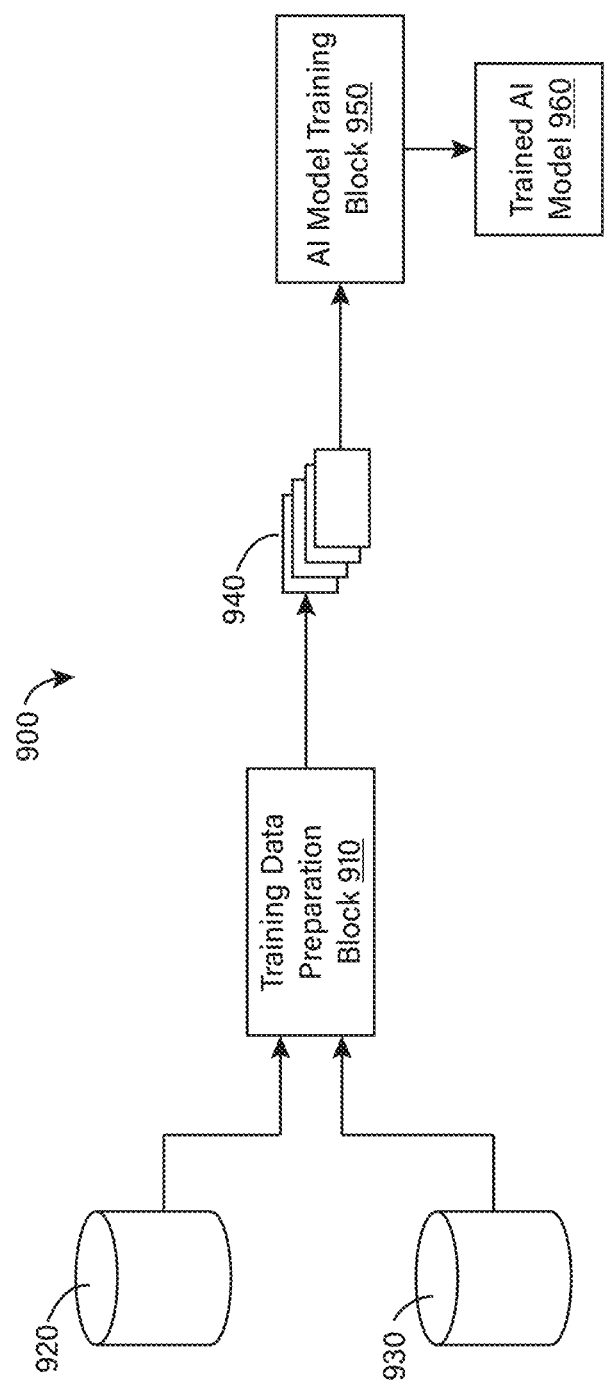
FIG. 9 is a block diagram illustrating an AI model training method with mixed synthetic robot data and true robot data.

FIG. 9 is a block diagram illustrating an example AI model training method 900.

In a training data preparation block 910, synthetic robot data 920 and true robot data 930 are used to prepare a training dataset 940. The synthetic robot data may be produced from synthetic source data collected with a substitute agent as described in Examples V, VI.A, and VI.B. The true robot data 930 can be expert data collected directly with a robot. The true robot data may be collected, for example, using a teleoperation system such as described in Example VII.

Each of the synthetic robot data 920 and true robot data 930 contributes a fraction of the training records in the training dataset 940. In some examples, the synthetic robot data 920 contributes a higher number of training records to the training dataset 940 compared to the true robot data 930.

In some examples, each of the training records contributed by the synthetic robot data 920 to the training dataset 940 may include a synthetic robot image and a set of robot arm parameters for a robot arm object in the synthetic robot image. The set of robot arm parameters may include, for example, a wrist pose in a camera frame and a set of finger poses. A finger pose is a set of joint angles (e.g., joint actuator positions) for a robot finger.

In some examples, each of the training records contributed by the true robot data 930 to the training dataset 940 may include a true robot image, a wrist pose in a camera frame, and a full robot joint pose. A full robot joint pose is a complete set of joint angles for all the joints on a robot.

The camera used in capturing the true robot images in the true robot data 930 may have the same model as the camera used in capturing the synthetic source images from which the synthetic robot images in the synthetic robot data 920 are derived.

In an AI model training block 950, an AI model is trained on the training dataset 940. Training can include adjusting the parameters of the AI model. The AI model training block 950 outputs a trained AI model that can accept an input image and predict a wrist pose in a camera frame and a set of finger poses.

The model training is architecture independent. The AI model can be implemented using various generative or probabilistic modeling techniques, such as diffusion models, flow models, and variational autoencoders (VAEs). Model training can include adjusting weights or parameters of the model.

Example VII.C—Model Training with Multi-Head Architecture

Figure 10:
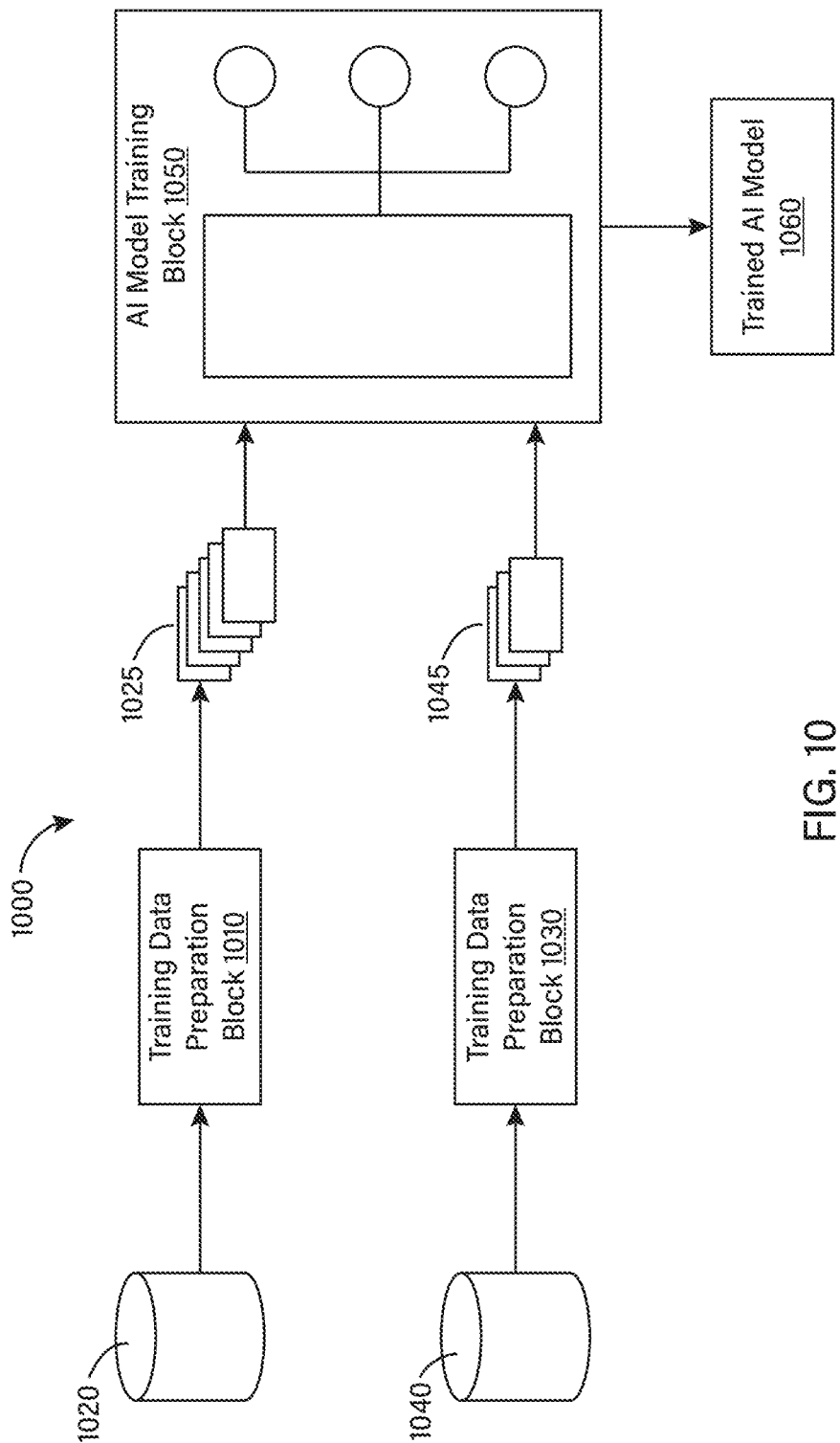
FIG. 10 is a block diagram illustrating an AI model training method with a multi-head architecture, synthetic robot data, and true robot data.

FIG. 10 is a block diagram illustrating an example AI model training method 1000.

In a training data preparation block 1010, synthetic robot data 1020 is used to prepare a first training dataset 1025. The synthetic robot data 1020 may be produced from synthetic source data collected with a substitute agent as described in Examples V, VI.A, and VI.B.

The first training dataset 1025 can include a plurality of training records prepared from the synthetic robot data 1020. Each training record may include a synthetic robot image and a set of robot arm parameters for a robot arm object in the synthetic robot image. The set of robot arm parameters may include, for example, a wrist pose in a camera frame and a set of finger poses. A finger pose is a set of joint angles (e.g., joint actuator positions) for a robot finger.

In a training data preparation block 1030, true robot data 1040 is used to prepare a second training dataset 1045. The true robot data 1040 can be expert data collected directly with a robot. The true robot data may be collected, for example, using a teleoperation system such as described in Example VII.

The second training dataset 1045 can include a plurality of training records prepared from the true robot data 1040. Each training record may include a true robot image, a wrist pose in a camera frame, and a full robot joint pose. A full robot joint pose is a complete set of joint angles for all the joints on a robot.

The camera used in capturing the true robot images in the true robot data 1040 may have the same model as the camera used in capturing synthetic source images from which the synthetic robot images in the synthetic robot data 1020 are derived.

In some examples, the number of training records in the training datasets 1025, 1045 are not equal. In particular, the first training dataset 1025 may be larger than the second training dataset 1045 (e.g., the number of training records in the first training dataset 1025 may be greater than the number of training records in the second training dataset 1045).

In an AI model training block 1050, an AI model is trained on the training datasets 1025, 1045. The model training uses a multi-head architecture, which means that the AI model has multiple output heads, each output head producing a separate prediction and being trained with a distinct loss function. Each output head can be a neural network. In one example, the AI model has three output heads with corresponding three loss functions.

In one example, the first head is trained to predict a wrist pose in a camera frame. The second head is trained to predict a set of finger poses for a robot hand. The third head is trained to predict a partial robot joint pose (e.g., a full robot joint pose without finger poses). The first training dataset 1025 (from the synthetic robot data) contributes to the learning of the first head and the second head. The second training dataset 1045 (from the true robot data) contributes to the learning of all the three heads. The AI model training block 1050 outputs a trained AI model 1060.

The AI model can be implemented using various generative or probabilistic modeling techniques, such as diffusion models, flow models, and variational autoencoders (VAEs). Model training can include adjusting weights or parameters of the model.

Additional Examples

Additional examples based on principles described herein are enumerated below. Further examples falling within the scope of the subject matter can be configured by, for example, taking one feature of an example in isolation, taking more than one feature of an example in combination, or combining one or more features of one example with one or more features of one or more other examples.

Example 1: A method implemented by a computing system, the method comprising: accessing first image data captured by a first camera of a first environmental scene in which a subject arm of a substitute agent performs a first task; obtaining a sequence of first images from the first image data, each first image including a subject arm object representing the subject arm and a background representing the first environmental scene; determining a set of robot arm parameters for each respective first image in the sequence of first images, wherein at least one of the robot arm parameters in the set of robot arm parameters is determined based on the subject arm object in the respective first image; for each set of robot arm parameters, rendering an image of a robot arm object based on the set of robot arm parameters and a robot arm model; for each robot arm object, compositing the image of the robot arm object with the respective first image in the sequence of first images to obtain a synthetic robot image including the robot arm object and the background of the respective first image; forming a sequence of synthetic robot images corresponding to the sequence of first images with the synthetic robot images; and storing the sequence of synthetic robot images in memory for use in generating training data for artificial intelligence model training.

Example 2: A method of according to Example 1, wherein determining the set of robot arm parameters for each respective first image in the sequence of first images comprises determining a hand pose of the subject arm object in the respective first image.

Example 3: A method according to Example 2, further comprising obtaining a wrist pose in a coordinate frame of the first camera from the hand pose, wherein the set of robot arm parameters includes the hand pose or the wrist pose or both the hand pose and the wrist pose.

Example 4: A method according to Example 2, further comprising obtaining a set of finger poses from the hand pose, wherein the set of robot arm parameters includes the set of finger poses.

Example 5: A method according to Example 3, wherein determining the set of robot arm parameters for each respective first image in the sequence of first images comprises: accessing finger sensor data outputted by sensors coupled to fingers of the subject arm; and determining a set of finger poses based on a portion of the finger sensor data corresponding temporally to the respective first image, wherein the set of robot arm parameters includes the set of finger poses.

Example 6: A method according to any of Examples 1-5, wherein determining the set of robot arm parameters for each respective first image in the sequence of first images comprises determining a wrist orientation for the set of robot arm parameters based on the subject arm object in the respective first image.

Example 7: A method according to Example 6, wherein determining the wrist orientation for the set of robot arm parameters based on the subject arm object in the respective first image comprises rendering the image of the robot arm object in a differentiable renderer that adjusts a wrist orientation of the robot arm object based on a wrist orientation of the subject arm object in the respective first image.

Example 8: A method according to any of Examples 1-5, wherein rendering the image of the robot arm object based on the set of robot arm parameters and the robot model comprises: constructing a 3D model of the robot arm object based on the set of robot arm parameters and the robot model; rendering a 2D image of the robot arm object from the 3D model of the robot arm object; obtaining a mask highlighting the subject arm object in the respective first image; determining that a difference between the rendered 2D image and the mask is above a threshold; and adjusting at least one robot arm parameter of the set of robot arm parameters based on the difference.

Example 9: A method according to Example 8, wherein adjusting the at least one robot arm parameter of the set of robot arm parameters based on the difference comprises adjusting a wrist orientation of the robot arm object based on the difference.

Example 10: A method according to any of Examples 8-9, wherein at least a distal part of the subject arm is covered with a chroma key material having a distinct color characteristic relative to the first environmental scene, and wherein the mask is obtained based on the distinct color characteristic.

Example 11: A method according to any of Examples 1-10, further comprising post-rendering each synthetic robot image to remove a residue of the subject arm object in the respective first image from the synthetic robot image.

Example 12: A method according to Example 11, wherein at least a distal part of the subject arm is covered with a chroma key material having a distinct color characteristic relative to the first environmental scene, and wherein post-rendering each synthetic robot image to remove the residue of the subject arm object in the respective first image from the synthetic robot image comprises identifying a portion of the synthetic robot image having the distinct color characteristic and rendering the portion with a different color characteristic sampled from the background of the synthetic robot image.

Example 13: A method according to any of Examples 1-12, wherein the first image data comprises one or more videos, and wherein the sequence of first images are frames of the one or more videos.

Example 14: A method according to any of Examples 1-13, wherein the substitute agent is a human agent, and wherein the first image data are captured by the camera from an egocentric viewpoint of the substitute agent.

Example 15: A method according to any of Examples 1-14, further comprising generating a first training dataset comprising a plurality of first training samples, each first training sample comprising a synthetic robot image from the sequence of synthetic robot images and at least one robot arm parameter from the set of robot arm parameters used in obtaining the synthetic robot image.

Example 16: A method according to Example 15, further comprising: accessing second image data captured by a second camera of a second environmental scene in which a robot arm performs a second task; obtaining a sequence of second images from the second image data; accessing a robot joint pose for each of the second images; and generating a second training dataset comprising a plurality of second training samples, each second training sample comprising one of the second images and the corresponding robot joint pose.

Example 17: A method according to Example 16, wherein the second task performed by the robot arm in the second environmental scene is the same as the first task performed by the subject arm in the first environmental scene.

Example 18: A method according to Example 16, wherein the robot arm performs the second task in the second environmental scene via teleoperation.

Example 19: A method according to Example 16, further comprising training an artificial intelligence model based on the first training dataset and the second training dataset to accept an input image including a robot arm object and a background and output a set of predicted robot parameters, wherein a training sample contribution of the first training dataset to the training of the model exceeds a training sample contribution of the second training dataset to the training of the artificial intelligence model.

Example 20: A method according to Example 19, wherein the set of predicted robot parameters comprises a wrist pose and a set of finger poses.

Example 21: A method according to Example 16, further comprising: pre-training an artificial intelligence model with the first training dataset to accept an input image including a robot arm object and a background and output a set of predicted robot parameters; and fine-tuning the pre-trained artificial intelligence model with the second training dataset to obtain a domain-specific trained artificial intelligence model; wherein a number of the first training samples of the first training dataset used in pre-training the artificial intelligence model is greater than a number of the second training samples of the second training dataset used in fine-tuning the pre-trained artificial intelligence model to obtain the domain-specific trained model.

Example 22: A method according to Example 21, wherein the set of predicted robot parameters comprises a wrist pose and a set of finger poses.

Example 23: A method according to Example 16, further comprising: combining a first number of the first training samples in the first training dataset with a second number of the second training samples in the second training dataset to form a mixed training dataset, wherein the first number of the first training samples in the mixed training dataset is greater than the second number of the second training samples in the mixed training dataset; and training an artificial intelligence model with the mixed training dataset to accept an input image including a robot arm object and a background and output a set of predicted robot parameters.

Example 24: A method according to Example 23, wherein the set of predicted robot parameters comprises a wrist pose and a set of finger poses.

Example 25: A method according to Example 16, further comprising training an artificial intelligence model with the first training dataset and the second training dataset to accept an input image including a robot arm object and a background and output a set of predicted robot parameters, wherein the artificial intelligence model has a plurality of output heads, wherein each output head is trained to output one of the predicted robot parameters in the set of predicted robot parameters, and wherein a training sample contribution of the first training dataset to the training of the artificial intelligence model is greater than a training sample contribution of the second training dataset to the training of the model.

Example 26: A method according to Example 25, wherein a subset of the output heads learn from the first training dataset, and wherein all of the output heads learn from the second training dataset.

Example 27: A method according to Example 25, wherein the plurality of output heads includes a first output head trained to output a wrist pose, a second output head trained to output a set of finger poses, and a third output head trained to output at least a partial robot joint pose.

Example 28: A method according to Example 27, wherein the first output head and the second output head learn from the first training dataset, and wherein the first output head, the second output head, and the third output head learn from the second training dataset.

Example 29: A method according to any of Examples 1-28, wherein compositing the image of the robot arm object with the respective first image in the sequence of first images to obtain the respective synthetic robot image comprises matching a wrist pose of the robot arm object with a wrist pose of the subject arm object in the respective first image.

Example 30: A method according to any of Examples 1-29, further comprising storing the sets of robot arm parameters in association with the sequence of synthetic robot images in the memory.

The invention claimed is:

1. A method implemented by a computing system, the method comprising:
   accessing first image data captured by a first camera of a first environmental scene in which a subject arm of a substitute agent performs a first task;
   obtaining a sequence of first images from the first image data, each first image including a subject arm object representing the subject arm and a background representing the first environmental scene;
   determining a set of robot arm parameters for each respective first image in the sequence of first images, wherein at least one of the robot arm parameters in the set of robot arm parameters is determined based on the subject arm object in the respective first image;
   for each set of robot arm parameters, rendering an image of a robot arm object based on the set of robot arm parameters and a robot arm model;
   for each robot arm object, compositing the image of the robot arm object with the respective first image in the sequence of first images to obtain a synthetic robot image including the robot arm object and the background of the respective first image;
   forming a sequence of synthetic robot images corresponding to the sequence of first images with the synthetic robot images; and
   storing the sequence of synthetic robot images in memory for use in generating training data for artificial intelligence model training.

2. The method of claim 1, further comprising storing the sets of robot arm parameters in association with the sequence of synthetic robot images in the memory.

3. The method of claim 1, wherein compositing the image of the robot arm object with the respective first image in the sequence of first images to obtain the respective synthetic robot image comprises matching a wrist pose of the robot arm object with a wrist pose of the subject arm object in the respective first image.

4. The method of claim 1, wherein determining the set of robot arm parameters for each respective first image in the sequence of first images comprises determining a hand pose of the subject arm object in the respective first image.

5. The method of claim 4, further comprising obtaining a wrist pose in a coordinate frame of the first camera from the hand pose, wherein the set of robot arm parameters includes the hand pose or the wrist pose or both the hand pose and the wrist pose.

6. The method of claim 4, further comprising obtaining a set of finger poses from the hand pose, wherein the set of robot arm parameters includes the set of finger poses.

7. The method of claim 4, wherein determining the set of robot arm parameters for each respective first image in the sequence of first images comprises:
   accessing finger sensor data outputted by sensors coupled to fingers of the subject arm; and
   determining a set of finger poses based on a portion of the finger sensor data corresponding to the respective first image, wherein the set of robot arm parameters includes the set of finger poses.

8. The method of claim 1, wherein determining the set of robot arm parameters for each respective first image in the sequence of first images comprises determining a wrist orientation for the set of robot arm parameters based on the subject arm object in the respective first image.

9. The method of claim 8, wherein determining the wrist orientation for the set of robot arm parameters based on the subject arm object in the respective first image comprises rendering the image of the robot arm object in a differentiable renderer that adjusts a wrist orientation of the robot arm object based on a wrist orientation of the subject arm object in the respective first image.

10. The method of claim 1, wherein rendering the image of the robot arm object based on the set of robot arm parameters and the robot model comprises:
    constructing a 3D model of the robot arm object based on the set of robot arm parameters and the robot arm model;
    rendering a 2D image of the robot arm object from the 3D model of the robot arm object;
    obtaining a mask highlighting the subject arm object in the respective first image;
    determining that a difference between the rendered 2D image and the mask is above a threshold; and
    adjusting at least one robot arm parameter of the set of robot arm parameters based on the difference.

11. The method of claim 10, wherein adjusting the at least one robot arm parameter of the set of robot arm parameters based on the difference comprises adjusting a wrist orientation of the robot arm object based on the difference.

12. The method of claim 1, further comprising post-rendering each synthetic robot image to remove a residue of the subject arm object in the respective first image from the synthetic robot image.

13. The method of claim 12, wherein at least a distal part of the subject arm is covered with a chroma key material having a distinct color characteristic relative to the first environmental scene, and wherein post-rendering each synthetic robot image to remove the residue of the subject arm object in the respective first image from the synthetic robot image comprises identifying a portion of the synthetic robot image having the distinct color characteristic and rendering the portion with a different color characteristic sampled from the background of the synthetic robot image.

14. The method of claim 1, further comprising generating a first training dataset comprising a plurality of first training samples, each first training sample comprising a synthetic robot image from the sequence of synthetic robot images and at least one robot arm parameter from the set of robot arm parameters used in obtaining the synthetic robot image.

15. The method of claim 14, further comprising:
accessing second image data captured by a second camera of a second environmental scene in which a robot arm performs a second task;
obtaining a sequence of second images from the second image data;
accessing a robot joint pose for each of the second images; and
generating a second training dataset comprising a plurality of second training samples, each second training sample comprising one of the second images and the corresponding robot joint pose.

16. The method of claim 15, wherein the second task performed by the robot arm in the second environmental scene is the same as the first task performed by the subject arm in the first environmental scene.

17. The method of claim 15, further comprising training an artificial intelligence model based on the first training dataset and the second training dataset to accept an input image including a robot arm object and a background and output a set of predicted robot parameters, wherein a training sample contribution of the first training dataset to the training of the model exceeds a training sample contribution of the second training dataset to the training of the artificial intelligence model.

18. The method of claim 15, further comprising:
pre-training an artificial intelligence model with the first training dataset to accept an input image including a robot arm object and a background and output a set of predicted robot parameters; and
fine-tuning the pre-trained artificial intelligence model with the second training dataset to obtain a domain-specific trained artificial intelligence model;
wherein a number of the first training samples of the first training dataset used in pre-training the artificial intelligence model is greater than a number of the second training samples of the second training dataset used in fine-tuning the pre-trained artificial intelligence model to obtain the domain-specific trained model.

19. The method of claim 15, further comprising:
combining a first number of the first training samples in the first training dataset with a second number of the second training samples in the second training dataset to form a mixed training dataset, wherein the first number of the first training samples in the mixed training dataset is greater than the second number of the second training samples in the mixed training dataset; and
training an artificial intelligence model with the mixed training dataset to accept an input image including a robot arm object and a background and output a set of predicted robot parameters.

20. The method of claim 15, further comprising training an artificial intelligence model with the first training dataset and the second training dataset to accept an input image including a robot arm object and a background and output a set of predicted robot parameters, wherein the artificial intelligence model has a plurality of output heads, wherein each output head is trained to output one of the predicted robot parameters in the set of predicted robot parameters, and wherein a training sample contribution of the first training dataset to the training of the model is greater than a training sample contribution of the second training dataset to the training of the model.

* * * * *